US012544792B2

(12) United States Patent
Sørensen et al.

(10) Patent No.: US 12,544,792 B2
(45) Date of Patent: *Feb. 10, 2026

(54) TURF INFILL SEPARATION SYSTEM AND METHOD FOR SEPARATING A DRY OR DRIED INFILL

(71) Applicant: Re-Match Holding A/S, Herning (DK)

(72) Inventors: Martin Welling Sørensen, Herning (DK); Rasmus Damhus, Herning (DK)

(73) Assignee: Re-Match Holding A/S, Herning (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/405,360

(22) Filed: Jan. 5, 2024

(65) Prior Publication Data

US 2024/0139776 A1    May 2, 2024

Related U.S. Application Data

(63) Continuation of application No. 17/641,471, filed as application No. PCT/EP2020/075213 on Sep. 9, 2020, now Pat. No. 11,872,594.

(30) Foreign Application Priority Data

Sep. 10, 2019   (EP) .................................... 19196430

(51) Int. Cl.
    *B07B 1/46*     (2006.01)
    *B07B 1/36*     (2006.01)
    *G01N 15/02*    (2006.01)

(52) U.S. Cl.
    CPC ............. *B07B 1/4636* (2013.01); *B07B 1/36* (2013.01); *G01N 15/0272* (2013.01); *B07B 2201/04* (2013.01)

(58) Field of Classification Search
    USPC ........................................................ 209/237
    See application file for complete search history.

(56) References Cited

U.S. PATENT DOCUMENTS

11,872,594 B2 *  1/2024  Sørensen ........... G01N 15/0272
2013/0017023 A1 *  1/2013  Nicholls ................. B29B 17/02
                                                   406/39

(Continued)

FOREIGN PATENT DOCUMENTS

CA      3153985 A1 *  3/2021  ............. B29B 17/02
EP      2862688 A1 *  4/2015  ............. E01C 13/08

(Continued)

OTHER PUBLICATIONS

International Search Report issued in corresponding PCT Application No. PCT/EP2020/075213, dated Dec. 9, 2020, pp. 1-3.

*Primary Examiner* — Terrell H Matthews
(74) *Attorney, Agent, or Firm* — Robinson & Cole LLP

(57) ABSTRACT

A separation system suitable for separating a dry or dried infill preferably including rubber and/or sand, into a plurality of fractions, the separation system includes a first screening means configured to receive a first set of separation screens said set of separation screens being configured to separate infill into a first plurality of fractions, wherein the separation system further includes a pre-analysis unit, a database and a processing unit configured to calculate correlation coefficients and/or deviation values between the first set of composition values and a plurality of second sets of composition values of the database; and a method for separating a dry or dried infill having a composition of materials, preferably including rubber and sand, into a plurality of fractions.

10 Claims, 10 Drawing Sheets

(56) References Cited

U.S. PATENT DOCUMENTS

2015/0209830 A1    7/2015  Edwards et al.
2016/0186387 A1*   6/2016  McAnany ............... E01C 13/08
                                                         264/35

FOREIGN PATENT DOCUMENTS

EP         3792027 A1 *  3/2021   ............ B29B 17/02
JP         2007132116 A   5/2007
KR         20150055759 A  5/2015

* cited by examiner

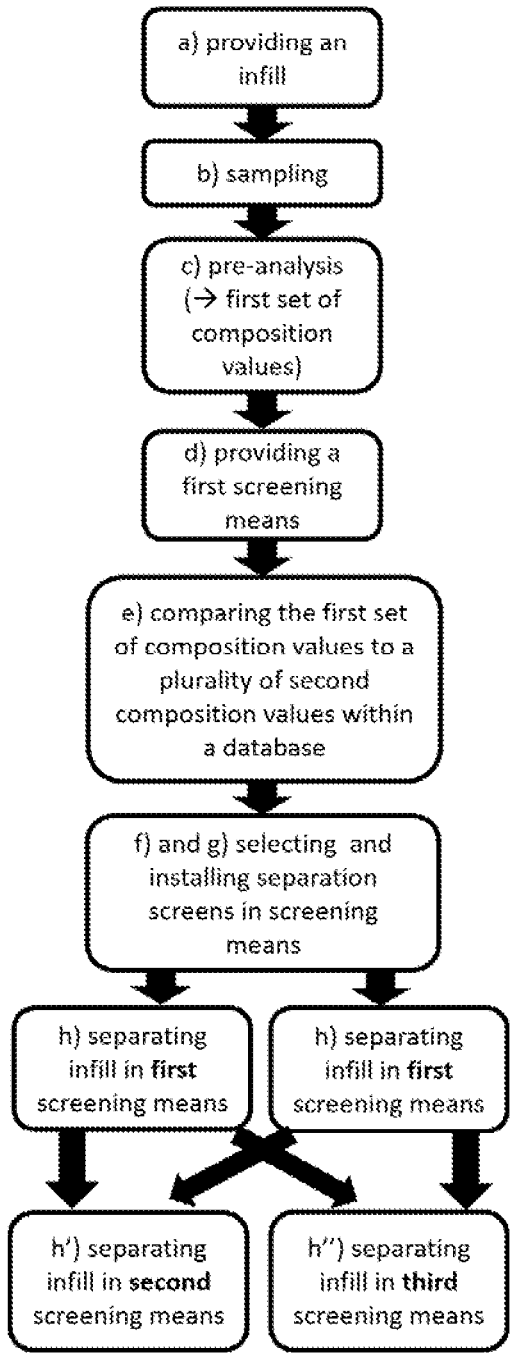

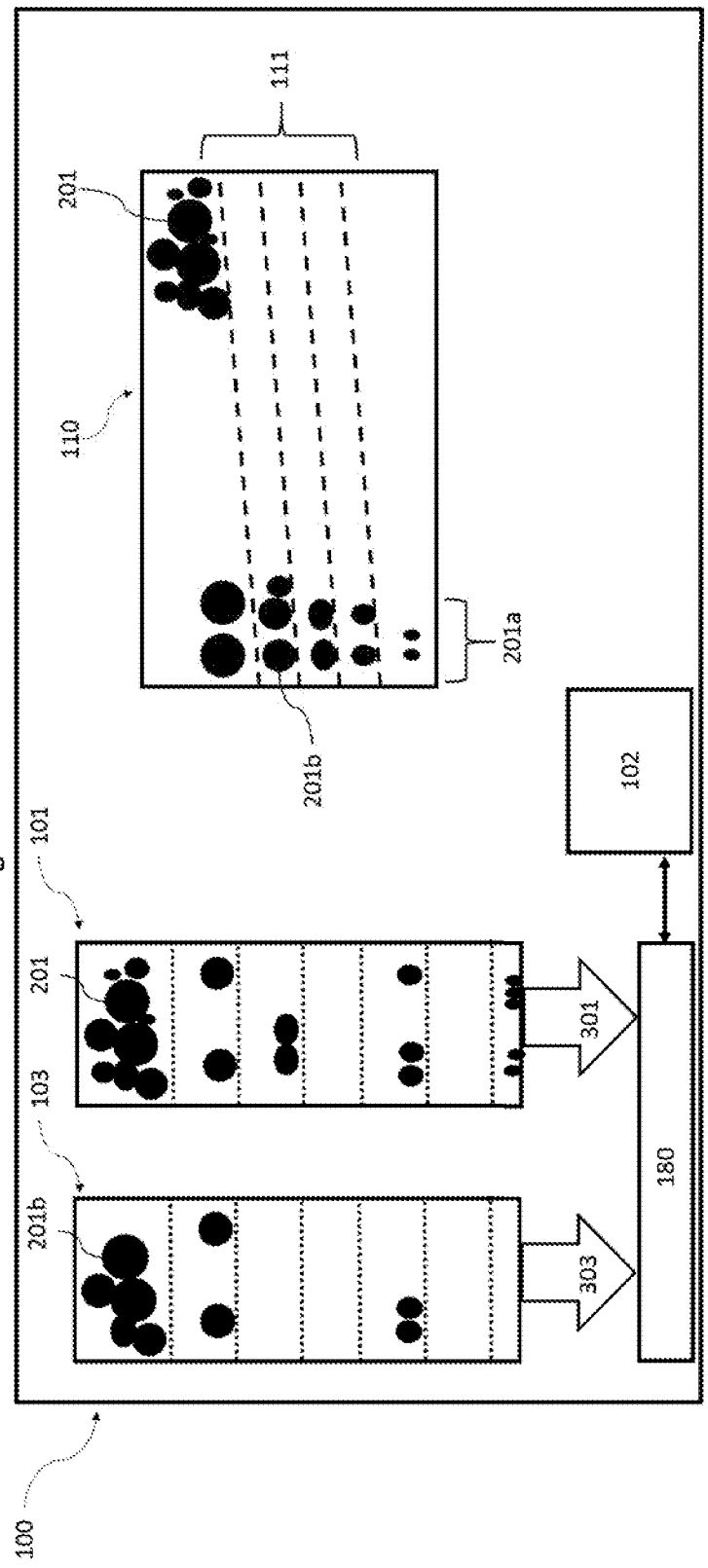

TURF INFILL SEPARATION SYSTEM AND METHOD FOR SEPARATING A DRY OR DRIED INFILL

CROSS-REFERENCE TO RELATED APPLICATIONS

The instant application is a continuation application claiming priority to U.S. patent application Ser. No. 17/641,471, filed on Mar. 9, 2022, now U.S. Pat. No. 11,872,594 B2, which is a U.S. National Stage application of and claims priority to PCT/EP2020/075213, filed on Sep. 9, 2020, which is a PCT application of and claims priority to EP Application No. 19196430.3 filed on Sep. 10, 2019, the subject matter of all aforementioned applications are hereby incorporated by reference in their entireties.

TECHNICAL FIELD

The present invention relates to an improved separation system and method for separating a dry or dried infill from e.g., an artificial turf product into a plurality of fractions having a high purity. The result is achieved by pre-analysing the infill material prior to the separation step in order to separate the infill material with selected separation screens.

BACKGROUND

Synthetic turf has been used for many years as surfaces for football, baseball and soccer fields. In the recent years it has been used in other applications where an alternative to natural grass is desired. These applications include at least playgrounds, residential and commercial lawns and other landscaping, paths, paintball fields, tennis courts, putting greens, dog runs etc.

Typically, synthetic turf includes a grass-like fabric having a backing and a plurality of upstanding ribbons, also called face fibers, resembling grass. Many synthetic turf products also include an infill material dispersed among the upstanding ribbons, which may consist of sand, tire rubber crumb, or other particulates, either singularly or in combination with each other. The infill material simulates the soil in natural turf, acts as a ballast, and/or contributes to the physical properties of the turf, such as resiliency, that make the turf suitable for a particular use.

Synthetic turf has a limited life span, depending on the construction of the turf, the application for which it is used, weathering and how the turf is maintained.

As an example, a typical synthetic turf for use as an athletic field may have a useful life of from about 8 to 15 years. A large amount of synthetic turf is currently being used in hundreds of athletic fields and in other applications.

Disposing of the turf is very expensive due to the composition of materials ranging from recycled rubber, sand to plastic. To avoid sending the turf to landfills at a substantial cost, recycling and reusing all or portions of the synthetic turf has been an explored option over recent years both to reduce costs but in more recent years to be able to upcycle and reuse and the individual components to greater extend.

Methods for recycling interior carpets and for preparing carpet backing using recycled carpet scrap are known. Some of such methods involve separating the carpet yarns, or tufts, from the backing, e.g. by cutting, and processing only yarns.

However, synthetic turf differs in composition from carpet, and those differences in composition make conventional carpet recycling processes unsuitable for recycling synthetic turf. Many synthetic turf products include components that are not found in carpet and that are incompatible with, or at least undesirable in, conventional carpet recycling methods. For example, conventional carpet does not include infill. Typical infill materials for synthetic turf installations include sand, coconut shells, tire rubber crumb, and/or other particulates, either singularly or in combination with each other. Thus, recycling synthetic turf presents a unique problem not encountered in the recycling of carpet.

Separating infill from the remainder of the turf may require use of special equipment, and there may be environmental concerns associated with disposing of the separated infill. Additional concerns in the recycling process are the effect of any residual infill particulates on the size reduction process and on the properties of the final products.

Thus, attempts have been made to recycle and reusing an existing synthetic turf, or at least a portion of an existing synthetic turf, to avoid sending the entire synthetic turf to a landfill when it is no longer useful. Such a process is described in WO 2010/075098 in which infill is separated from the backing and the grass like fibers followed by downsizing and further removal of infill followed by agglomeration. The granules of agglomerated turf fragments are placed into an extruder. The granules are extruded to form an extrudate, for example in the shape of a strand or ribbon. Another process described in US20150209830A1 uses vibrating screens and separates artificial turf infill material by density.

Most known processes consequently recycle the constituents of carpets or turfs to new products of mixed components and do not reverse engineer the products into the individual starting components.

US 2016/186387 describes a system and method for reclaiming the rubber infill typically used in conjunction with artificial turf. US2016/183387 uses an aspirator to remove the sand from the rubber pellets. The rubber may also be treated during this process to remove debris. The rubber may then be reused during the reinstallation of the turf.

US2013/017023 describes an onsite system and method for recycling infill. Infill is extracted from the turf and separated in primarily rubber, sand and debris in a screen separator followed subsequent by further separation in a destoner and a silo screen for the rubber and sand fractions separately.

EP2862688 to the same applicant similarly describes a process in which infill of sand and rubber originating from dry or dried turf product is separated into the clean sand and rubber in a series of purification steps Also, further known processes do not furnish a flexible process where different artificial turf infill with various compositions can be separated efficiently within the same recycling site and with a high yield and purity.

Thus, while the prior art processes are an improvement over disposing the material at the land fill, there is still a need to separate the individual parts further, into fractions substantially comprising one component, preferably within a pre-defined range of particle size, in order to provide improved grade products and to provide processes that are flexible to receive various compositions of different artificial turf products.

It is also desirable to provide processes in which the result is the individual components purified to a degree that is high enough for reuse as turf or in other industries.

Finally, it is desirable to provide efficient processes that do not rely heavily on natural resources, such as water.

Therefore, an aim of the present invention is to provide a process and system for separating constituents of various infill products and also to provide a process resulting in high purity of each of the separated constituents thus solving one or more of the above challenges.

SUMMARY OF THE INVENTION

In view of the above, an object of the present invention is to provide a method and system for separating a dry or dried infill, such as from an artificial turf product, into a plurality of fractions. The inventive concept presents the solution to a challenging task, the efficient separation of infill with various compositions into at least one of graded sand, granulated styrene-butadiene rubber, cork, organic infill, thermoplastic elastomers, or ethylene propylene diene monomers. Simultaneously, the present inventive concept is beneficial for the environment since the efficient separation of infill, such as from artificial turf, is a key technology during the recycling process of infill from artificial turf and other products.

Fractions obtained according to the invention are characterized by having a purity of at least exceeding 95% (w/w) for the component in question.

Accordingly, there is provided a method for separating a dry or dried infill having a composition of materials, preferably comprising rubber and sand, into a plurality of fractions, comprising the steps of:
(a) providing a dry or dried infill;
(b) taking out a sample of the dry or dried infill;
(c) pre-analysing the composition of the sampled dry or dried infill, e.g. from a first artificial turf product, so as to obtain a first set of composition values corresponding to the composition of the infill and/or first artificial turf product, said pre-analysis comprising the steps of:
  (i) separating the infill into a plurality of analysis fractions based on particle size and/or specific gravity by a pre-analysis unit, and
  (ii) determining the relative content of each separated analysis fraction in relation to the total content of analysed infill;
(d) providing at least a first screening means configured to receive at least a first set of separation screens, the at least first set of separation screens being configured to separate the infill into a plurality of fractions;
(e) comparing the first set of composition values of the dry or dried infill with a plurality of second sets of composition values a database, each set of second composition values corresponding to a composition of materials and to a predetermined set of second separation screens, so as to obtain a correlation coefficient and/or deviation value between the first set of composition values and each of the plurality of second sets of composition values of the database;
(f) selecting the at least first set of separation screens to be received by the at least first screening means by selecting a set of separation screens corresponding to a second set of composition values and having a correlation coefficient above a predetermined threshold and/or having a relatively low deviation value, preferably the lowest available deviation value, when compared to first set of composition values;
(g) installing the selected first set of separation screens in the first screening means; and
(h) separating the infill into the plurality of fractions.

The composition of different infill products such as from artificial turf products is very heterogeneous. Depending e.g. on the climate of where the turf is used, or the type of sports being practiced on the turf, the composition is adapted to meet certain needs. Also, dependent on the manufacturer and age the materials used for infill and artificial turf production may vary. Using a database and pre-analysing the turf and/or infill before separation according to the present inventive concept, the separation process is capable of separating infill with such varying compositions in a shortened, less cumbersome and more predictable manner, without compromising the homogeneity or purity of the separated fractions.

The term "dry or dried infill" in the context of the invention means infill substantially free from excess water or other liquids, e.g. infill that has been dried by appropriate storing conditions in a dry environment or infill that has been dried by an apparatus such as a fluid bed dryer. The dry or dried infill suitably can be from an artificial turf product. Particularly the separation of very fine sand is affected by the moisture content.

The term "separating" in the context of the invention means to separate a heterogeneous composition into a less heterogeneous fraction, preferably a homogeneous fraction, the heterogeneity being defined through e.g. particle size, density, specific gravity and or material.

The term "artificial turf product" in the context of the invention contemplates all the components of the starting material used in the process of the invention. Synthetic and artificial may be used interchangeably and have the same meaning, namely a grass like product made of predominantly non-biological material. The starting material for the process of invention, i.e. the dry or dried infill, suitably originates from a turf product from a sports facility, a playground, a landscaping area, and the like. The origin of the material should not be limiting. It is also contemplated that the material may comprise contaminants.

The term "plurality of fractions" in the context of the invention means two or more fractions obtained by separation, wherein each fraction preferably is predominantly consisting of substantially the same material, having substantially the same specific gravity and having a particle size within a certain range of particle size.

The term first dry or dried infill in the context of the invention means the dry or dried infill which is to be separated into a plurality of fractions. Before being separated into a plurality of fractions, the first dry or dried infill also provides material for the pre-analysis.

The term "fine sand" and the term "rough sand" are describing the range of sand particle size in relative terms to another. When sand particles in the size range from 0.5-0.6 mm and sand particles in the size range from <0.2-0.5 mm are present as two fractions, then the fraction with sand particles in the size range from 0.5-0.6 mm is considered to be rough sand, while the fraction with sand in the particle size range from <0.2-0.5 mm is considered fine sand. Alternatively, when sand particles in the size range from 0.2-0.5 mm and sand particles with a particle size <0.2 mm are present as two fractions, then the fraction with sand particles in the size range from 0.2-0.5 mm is considered to be rough sand, while the fraction with sand particles with a particle size <0.2 mm is considered fine sand. Suitably, when sand particles in the size range from 0.2-0.6 mm and sand particles in the size with a particle size of <0.2 mm are present as two fractions, then the fraction with sand particles in the size range from 0.2-0.6 mm is considered to be rough sand, while the fraction with sand particles with a particle size <0.2 mm is considered fine sand. Furthermore, when sand particles in the size range from <0.2-0.6 mm and sand particles in the size with a particle size of >0.6 mm are present as two fractions, then the fraction with sand particles in the size range from <0.2-0.6 mm is considered to be fine sand, while the fraction with sand particles with a particle size >0.6 mm is considered rough sand.

The term "pre-analysing" in the context of the invention means a step of analysis on a small scale prior to the separation of the bulk infill by a screening means on a larger scale. During pre-analysis a sample of the infill is separated into a plurality of analysis fractions based on specific gravity/and or particle size in a pre-analysis unit, such as a vibratory sieve shaker with progressively finer mesh sizes. Thereby it is possible to obtain an overview of the composition of the infill before its separation. The inventors have found that the knowledge about the material composition of a sample enables to choose separation screens with properties (e.g. mesh size) that increase the separation efficiency also on a large scale.

Suitably the pre-analysis is additionally or alternatively carried out more than once for obtaining a plurality of composition results and/or a composition mean value to decrease potential measurement errors.

The term "set of composition values" in the context of the invention means values obtained by pre-analysis characterizing a composition of an analysed material after being separated into analysis fractions on a small scale. The set of composition values comprises one or more values, each value can e.g. represent the weight of an analysis fraction and/or the relative weight of an analysis fraction in relation to the total weight of the analysed sample. The obtained set of composition values can be seen as a "footprint" for each infill and/or first artificial turf product to distinguish it from other infill and/or artificial turf products. The obtained first set of composition values can furthermore be compared with second sets of composition values from previously analysed and separated second artificial turf products and/or infill. Thereby it is possible to identify one or more previously analysed and separated second dry or dried infill which have a similar second set of composition values to the first set of composition values of the first dry or dried infill. This matching enables the skilled person to identify the set of separation screens which has been used for the separation of the second dry or dried infill in a screening means. Said set of separation screens have shown a good separation efficiency for separating the said second dry or dried infill and therefore most likely will also provide a good separation efficiency for the matched first dry or dried infill. The first set of composition values is obtained by separating infill from the first infill material into analysis fractions and by determining the relative proportion of each fraction in % (w/w) of each analysis fraction. Each analysis fraction is characterized by having a certain range of particle size and/or by comprising one or more materials. The first set of composition values comprises one or more values.

Suitably the matched set of separation screens for the separation of the first dry or dried infill in the first screening means is additionally or alternatively only used for a limited time before being replaced by another set of separation screens. The replacement of one or more separation screens in the set of separation screens by another separation screen can furthermore improve the overall separation efficiency. The screen replacement takes place during operation of the screening means or during a short pause of the operation of the screening means. After replacement of at least one separation screen in the screening means the infill is sent through another set of separation screens with increased infill separation efficiency.

The term "composition" in the context of the invention means the nature of the ingredients or constituents of an artificial turf product or infill. The composition can be understood as the presence of one or more materials, such as graded sand, granulated styrene-butadiene rubber, coconut shells, cork, organic infill, thermoplastic elastomers, or ethylene propylene diene monomers, and/or the specific gravity, proportional content (e.g. by mass) and/or particle size of said materials.

The term "analysis fraction" in the context of the invention means a fraction obtained by separation of the first dry or dried infill during pre-analysis.

The term "screening means" in the context of the invention means any apparatus configured to separate bulk material of different grain or particle sizes into a plurality of fractions with pre-determined grain or particle size. The separation of material is carried out through horizontally vibrating separation screens with defined mesh sizes and/or perforations. The screening means has external screen outlets which allows very good accessibility and renders a high flexibility since the screens can easily be replaced with screens of another mesh size and/or perforation.

The term "set of separation screens" in the context of the invention means two or more separation screens for separation of dry or dried infill. Within a set of separation screens, the individual separation screens may have similar, identical or substantially different mesh sizes and/or perforations.

The term "database" in the context of the invention means a list of composition values of previously analysed and separated dry or dried infill and the corresponding set of separation screens, including information about their mesh size and/or perforation, used for separation of said previously separated dry or dried infill. The database enables a good overview of previously analysed and separated second dry or dried infill and provides the basis for matching the composition value set from a first dry or dried infill with second composition value sets from second dry or dried infill. Suitably the database with its organized collection of data is stored and accessed electronically from a computer system. The database can exemplary be a spreadsheet program storing the composition values arranged in rows and columns that can be manipulated mathematically using both basic and complex arithmetic operations and functions.

The term "purity" or "high purity" in the context of the invention means that the particles within an analysed fraction have substantially the same particle size and/or that the particles within an analysed fraction are made of the same material, preferably one or more of coconut shell, fine sand, rough sand, graded sand, granulated styrene-butadiene rubber (SBR), crumb rubber, cork, organic infill, thermoplastic elastomers (TPE), thermoplastic olefins (TFO), neoprene rubber, fiberglass, polyethylene, polypropylene, nylon, or ethylene propylene diene monomers (EPDM). Alternatively the particles within an analysed fraction have a particle size within a pre-determined range of particle size and the particles within an analysed fraction are made of the same material, preferably one or more of coconut shell, fine sand, rough sand, graded sand, granulated styrene-butadiene rubber (SBR), crumb rubber, cork, organic infill, thermoplastic elastomers (TPE), thermoplastic olefins (TFO), neoprene rubber, fiberglass, polyethylene, polypropylene, nylon, or ethylene propylene diene monomers (EPDM).

Alternatively, the term purity or high purity means a material purity in a separated fraction exceeding 95% (w/w), 96% (w/w), 97% (w/w), 98% (w/w), 99% (w/w) or approximately 100% (w/w).

A high purity is essential for the re-use of the material. The purity of rubber, sand and/or other infill fractions can be determined by standard tests which are well known to the skilled person, e.g. D5603 from ASTM International for testing the purity of rubber.

The term "correlation coefficient" in the context of the invention means a numerical measure of some type of correlation, describing a statistical relationship between two variables. The variables may be two or more columns of a given data set of composition values. Thereby the correlation coefficient represents a correlation and/or statistical relationship between the first and second sets of composition values, and/or between values of the first set of composition values and values of the second sets of composition values and enables the identification of a second set of composition values with a high correlation and/or statistical relationship to the first set of composition values. Suitably a correlation coefficient can also be determined between any suitable data points within a set of composition values and any suitable data points within another set of composition values.

The term "deviation value" in the context of the invention means a measure of difference between the first set of composition values and the second sets of composition values from the database and/or values of the first set of composition values and values of the second sets of composition values from the database. The determination of deviation values is a fast and easy measure to identify second sets of composition values with a low deviation from the first set of composition values. Suitably the deviation values can also be determined between any suitable data points within a set of composition values and any suitable data points within another set of composition values.

The deviation value(s) can be determined using the relative proportion(s) of fraction(s) within the total sample of each first, second or further infill, e.g. by weight percentage (% (w/w)). Suitably a low deviation value or relative low deviation value means a relative fraction proportion deviation value equal to or below 0.5% (w/w), 2% (w/w), 5% (w/w) or 15% (w/w) for fractions with particle sizes equal to or above 1.6 cm. Suitably a low deviation value or relative low deviation value means a relative fraction proportion deviation value equal to or below 0.05% (w/w), 0.1% (w/w), 0.5% (w/w), 1% (w/w), 2% (w/w) or 10% (w/w) for fractions with particle sizes within the range of 1.0-1.4 cm. Suitably a low deviation value or relative low deviation value means a relative fraction proportion deviation value equal to or below 0.5% (w/w), 2% (w/w), 5% (w/w), 10% (w/w), 15% (w/w) or 25% (w/w) for fractions with particle sizes within the range of 0.2-0.8 cm. Suitably a low deviation value or relative low deviation value means a relative fraction proportion deviation value equal to or below 0.005% (w/w), 0.01% (w/w), 0.05% (w/w), 0.1% (w/w), 0.5% (w/w), 1% (w/w), 2% (w/w), 3% (w/w), 4% (w/w) or 5% (w/w) for fractions with particle sizes equal to or below 0.2 cm.

The term "threshold" in the context of the invention means a set value or magnitude that must be exceeded by the correlation coefficient in order to match the first set of composition values with at least one second set of composition values. The threshold ensures that the matches between the first set of composition values and second set(s) of composition values have a pre-determined correlation and/or statistical relationship between another. This enables the identification and selection of sets of separation screens with a good separation efficiency for the corresponding first dry or dried infill.

According to a second aspect of the present inventive concept, there is provided a separation system suitable for separating a dry or dried infill, preferably from an artificial turf product said infill preferably comprising rubber and/or sand, into a plurality of fractions, the separation system comprises a first screening means configured to receive a first set of separation screens, said set of separation screens being configured to separate infill, into a first plurality of fractions, wherein the separation system further comprises a pre-analysis unit configured to determine the composition of the dry or dried infill by particle size and/or specific gravity so as to obtain a first set of composition values corresponding to the relative content of each separated analysis fraction in relation to the total content of analysed infill; a database comprising a plurality of second sets of composition values, each sets of composition values corresponding to a composition of dry or dried infill from a plurality of different second infills, and to a first set of pre-determined separation screens for the separation of infill from said second infills; and a processing unit configured to calculate a correlation coefficients and/or deviation values between the first set of composition values and each of the plurality of second sets of composition values of the database.

Providing a database and a processing unit enables a fast and convenient comparison of the infill composition from the first dry or dried infill with various infill compositions from previously analysed and separated second dry or dried infills. Thereby the processing unit precisely calculates correlation coefficients and/or identifies deviation values between the first and second compositions to select a set of separation screens for efficient separation of the infill, e.g. from the first dry or dried infill. The easy identification and selection of a set of separation screens for efficient separation of the pre-analysed infill reduces the necessity for performing tedious trial and error attempts by using different sets of separation screens until an efficient separation is achieved to a minimum.

The term pre-analysis unit in the context of the invention means any analysis unit capable of determining the composition of an infill such as by separating the sample into several fractions with pre-determined specific gravity and/or particle size. The pre-analysis unit can e.g. be a vibratory sieve shaker, such as a vibratory sieve shaker with progressively finer mesh sizes as the commercially available sieve shaker "AS 200 basic" (Retsch®) or any other suitable sieve shaker.

The term "processing unit" in the context of the invention means any unit known to the skilled person configured to perform data processing, handle arithmetic and logical operations, execute instructions and/or receive data. The processing unit provides an automatic and convenient data processing to calculate the correlation coefficients and/or to identify the deviation values between the first and second compositions within the database to select a set of separation screens for efficient separation of the infill.

Suitably the processing unit is a computational unit comprising software for data processing, statistical calculations, mathematical operations and/or database management.

The term "NSL" is the abbreviation for Nasenloch and describes separation screens which have perforations that are slightly elevated compared to the non-perforated parts of the separation screens. These elevated perforations (NSL) furthermore increase the separation efficiency of infill compared to completely even separation screens. Within a set of separation screens, suitably one or more separation screens can be a NSL screen with elevated perforations.

Other objectives, features and advantages of the present inventive concept will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

BRIEF DESCRIPTION OF THE DRAWINGS

The above, as well as additional objects, features and advantages of the present inventive concept, will be better understood through the following illustrative and non-limiting detailed description of preferred embodiments of the present inventive concept, with reference to the appended drawings, where the same reference numerals will be used for similar elements, wherein:

FIG. 9 is a schematic overview of an infill separation system with an in-line analysis unit.

DETAILED DESCRIPTION

In the following, embodiments of the system and method for separating a dry or dried infill will be described with reference to FIGS. 1-9.

Figure 1:
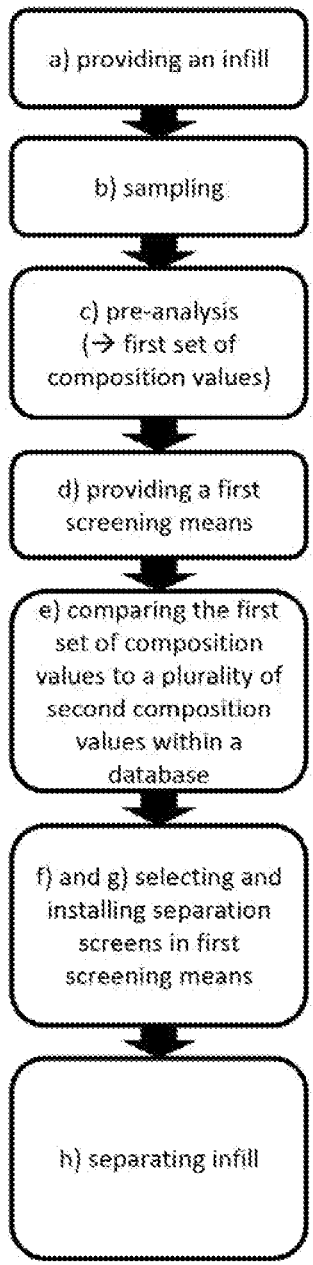
FIG. 1 is a schematic overview of the method for separating infill in one screening means.

With reference to FIG. 1, according to a first aspect of the invention a schematic overview of the method for separating a dry or dried infill having a composition of materials, preferably comprising rubber and sand, into a plurality of fractions is shown. The method comprises at least one of the following steps of:

(a) providing a dry or dried infill;
(b) taking out a sample of the dry or dried infill;
(c) pre-analysing the composition of the sampled dry or dried infill so as to obtain a first set of composition values corresponding to the composition of the infill, said pre-analysis comprising the steps of
  (i) separating the infill into a plurality of analysis fractions based on particle size and/or specific gravity by a pre-analysis unit, and
  (ii) determining the relative content of each separated analysis fraction in relation to the total content of analysed infill;
(d) providing at least a first screening means configured to receive at least a first set of separation screens, the at least first set of separation screens being configured to separate the infill into the plurality of fractions;
(e) comparing the set of first composition values of the dry or dried infill with a plurality of second sets of composition values of a database, each second set of composition values corresponding to a composition of materials and to a predetermined second set of separation screens, so as to obtain a correlation coefficient and/or deviation value between the set of first composition values and each of the plurality of second sets of composition values of the database;
(f) selecting at least the first set of separation screens to be received by the at least first screening means by selecting a set of separation screens corresponding to a second set of composition values and having a correlation coefficient above a predetermined threshold and/or having a deviation value lower than 20% (w/w), lower than 15% (w/w), preferably lower than 10% (w/w), more preferably lower than 5% (w/w), more preferably lower than 2% (w/w), most preferably lower than 1% (w/w) relative fraction proportion, preferably the lowest available deviation value, when compared to the first set of composition values;
(g) installing the selected first set of separation screens in the first screening means; and
(h) separating the infill into the plurality of fractions.

Preferably the dry or dried infill comprises rubber and sand. The rubber material can be selected from but is not limited to styrene-butadiene rubber (SBR), ethylene-propylene-diene rubber (EPDM), thermoplastic elastomer rubber (TPE), thermoplastic olefin rubber (TPO), or a combination thereof. Since the material composition of dry or dried infill can vary, it is also possible to separate infill comprising rubber in combination with other materials, excluding sand; and/or comprising sand in combination with other materials, excluding rubber. Alternatively, the material composition of the dry or dried infill can also be essentially free of rubber and sand.

Step (a) includes providing a dry or dried infill. Suitably the dry or dried infill is from an artificial turf product.

Prior to step (a), the provided infill of any source is suitably subjected to a drying process wherein the relative moisture content of the infill is significantly reduced. Typically, prior to the drying process the relative moisture content of the infill is between 3-7% (w/w). During the drying process, the moisture content preferably is reduced to 1-5% (w/w), 0.5-2% (w/w), 0.1-1% (w/w), 0.01-0.5% (w/w) or 0.0001-0.05% (w/w).

Exemplary, the moisture content of sand separated from dry or dried infill is preferably equal to or below 0.0005% (w/w).

In step (b) a sample of the dry or dried infill is taken. Preferably, the sample is representing the overall material composition of the infill. The total number of samples taken for pre-analysis can be two, three, four or more than four. Suitably two, three or more than three samples are taken from different locations of the infill if the total area of the artificial turf product exceeds a certain size, such as 100 m², 200 m², 500 m², 1.000 m², 2.000 m², 4.000 m², 6.000 m², 8.000 m², or 10.000 m² or if the total weight of the infill exceeds 20 kg, 50 kg, 100 kg, 500 kg and/or 1000 kg. Suitably the total number of samples taken for pre-analysis increases with the total area/size or total weight of the artificial turf product and/or dry or dried infill. Alternatively, the total number of samples is unchanged and independent from the total area/size or total weight of the artificial turf product and/or dry or dried infill, such as three samples. When the infill sample is taken from an artificial turf product, the infill sample is taken directly from the intact artificial turf product, e.g. when being rolled up for transportation from the field to the recycling-site and before arriving for processing. Alternatively, the infill sample can be taken after the majority of the infill has been separated from the remainder of the artificial turf product, either before, during and/or after drying the infill. When the infill from two or more artificial turf products is combined for the separation process, suitably there are samples taken from each of the infills of the different artificial turf products.

The sampling can either be performed in a random location of the turf product and/or infill or in a systematic manner. Preferably the samples are taken in a systematic manner, e.g. if the product is transported from the field to the recycling-site by a plurality of transport vehicles, samples are taken from every single transport vehicle or from several different transport vehicles.

In step (c) the pre-analysis of the composition of the sampled dry or dried infill is carried out. The pre-analysis results in a first set of composition values corresponding to the composition of the infill, e.g. from the first artificial turf product. During pre-analysis, the infill is separated into a plurality of analysis fractions based on particle size and/or specific gravity.

Suitably the pre-analysis is carried out with an analytical sieve shaker, such as Retsch AS200 Basic®. Typically, such analytical sieve shakers have a measuring range for particles in the size range of 20 µm-25 mm.

Prior to or during pre-analysis the weight of the infill sample is determined, e.g. with a scale or via the pre-analysis unit if the pre-analysis unit has an integrated scale. During or after pre-analysis the weight of each analysis fraction is determined via a scale or via the pre-analysis unit if the pre-analysis unit has an integrated scale. Based on the determined sample and fraction weights, the relative content in relation to the total sample, preferably as % (w/w), is calculated for each analysis fraction to obtain the data points for the first set of composition values. Suitably, each of the analysis fractions is differing from the other analysis portions with regards to range of particle size, and/or range of specific gravity. Each data point of the first set of composition values is subsequently added to a database. In addition to the first set of composition values the database entries suitably also comprises information about the rubber size, rubber material, rubber colour, size of sand particles, backing material, turf material, operator name and/or any additional comments.

In step (d) at least a first screening means configured to receive at least a first set of separation screens is provided. The at least first set of separation screens is configured to separate the infill into the plurality of fractions. With the variable screen design, the screening means separates infill material of different grain sizes and density. Suitably there are two or more screening means provided, whereof all screening means are configured to receive a set of separation screens.]

In step (e) the first set of composition values of the dry or dried infill obtained in step c) is compared with a plurality of second sets of composition values of a database/data source. Each second set of composition values corresponds to a composition of materials and to a second set of separation screens previously determined. By comparing the first set of composition values with the second sets of composition values, a correlation coefficient and/or a deviation value between the first set of composition values and each of the plurality of second sets of composition values of the database, is obtained.

Alternatively, any other suitable type of calculation or analysis can be made to determine the level of similarity between the first set of composition values and the second sets of composition values, such as using artificial intelligence and/or image recognition to determine the similarity between infill material from different products. For example, artificial intelligence can match the first set of composition values with a second set of composition values having the most similar pattern of particle size distribution within all the sets of second composition values. The correlation coefficients and/or deviation values are preferably determined by a processing unit. The processing unit has access to the database and/or is an integrated part thereof or vice versa.

In step (f) at least the first set of separation screens to be received by the at least first screening means is selected. Within step (f) it is also possible to select two or more sets of separation screens for a total of two or more screening means. The processing unit identifies the separation screens corresponding to a second composition value set of the database having a correlation coefficient over a predetermined threshold and/or having a deviation value suitably lower than 20% (w/w), lower than 15% (w/w), preferably lower than 10% (w/w), more preferably lower than 5% (w/w), more preferably lower than 2% (w/w), most preferably lower than 1% (w/w) relative fraction proportion, such as the lowest available deviation value, when compared to the first set of composition values, or any other calculation that determines relative similarity to the first composition value set. The processing unit preferably identifies the separation screens corresponding to a second set of composition values having the lowest deviation value and/or the highest correlation coefficient when compared to the first set of composition values.

Each value within the first set of composition values can be matched with a corresponding value of a second set of composition values having the lowest deviation and/or highest correlation within the plurality of second sets of composition values. With this for every value of the first set of composition values, a value from a second set of composition values is obtained matching a value of the first set of composition values. Suitably the second infill or infill batch relating to the second set of composition values which is listed more often than other second sets of composition values will be used to select the set(s) of separation screens in the screening means. Meaning, the same set(s) of separation screens used in the separation of the best matching second infill or infill batch will be selected for the separation of the first dry or dried infill.

Suitably, the database entries for each second set of composition values of previously separated infill material comprise information about the set(s) of separation screens, rubber size, rubber material, rubber colour, size of sand particles, backing material, turf material, operator name, batch number, additional comments, precise information about the relative content of each fraction with regards to the total analysed and/or separated material, and/or information about the particle size and/or specific gravity of each fraction.

The set(s) of separation screens related to the second sets of composition values are stored in the database and were previously identified to be highly efficient in infill separation, such as infill from artificial turf products. Information about the set(s) of separation screens in the database comprises the mesh size of each separation screen.

In step (g) the selected first set of separation screens is installed in the first screening means. Preferably the mesh sizes of the first set of separation screens as well as the number of separation screens of the set of separation screens are identical to the mesh sizes and number of separation screens of the set of separation screens which previously has been used to efficiently separate the infill having a composition value set with a high correlation coefficient and/or low deviation value to the first composition value set of the pre-analysed infill.

In step (h) the infill is separated into the plurality of fractions by the first screening means. The separation is achieved through the separation screens which are horizontally vibrated by an electric motor or any other suitable type of motor. Inside the screening means the separation screens are installed on top of another with an appropriate horizontal gradient. The distance between the separation screens is chosen to allow horizontal and, to some extent, vertical movement of the infill material. For separation, the infill material is added to the screening means above the most upper separation screen. The horizontal vibrations transport the infill material along the separation screens. Separation screens with a mesh size above the particle size of the infill material allow the infill material to pass through the separation screen towards the next separation screen or towards the bottom of the screening means. In contrast, infill material with a particle size above the mesh size of the separation screen will not pass the separation screen and will be transported horizontally to the edge of the separation screen. The separation process accumulates a plurality of fractions, namely the fraction below the most bottom separation screen, the fraction above the most upper separation screen and the fraction(s) between each of the separation screens. Each fraction of the plurality of fractions is captured during and/or at the end of the separation process. Suitably one or more fractions of the plurality of fractions are directly forwarded to another screening means for further separation.

Figure 2:
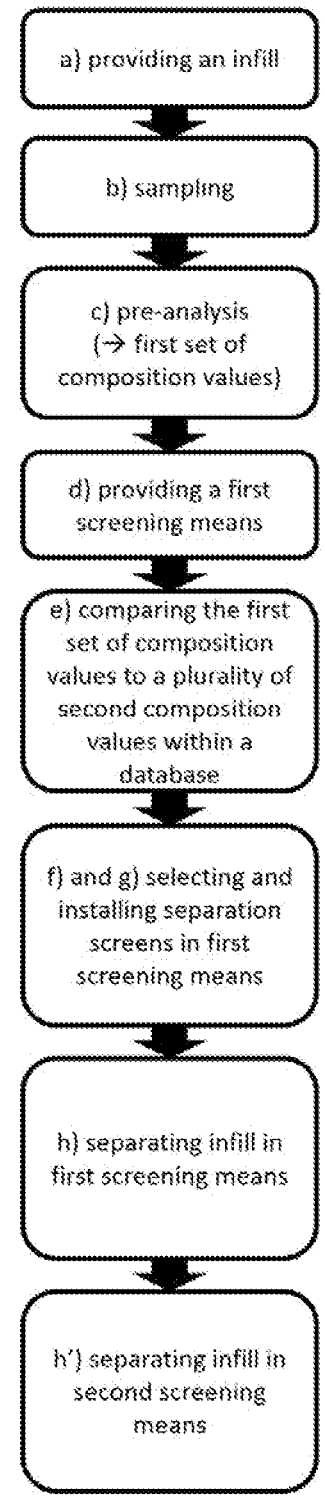
FIG. 2 is a schematic overview of the method for separating infill in two screening means.
Figure 3A:
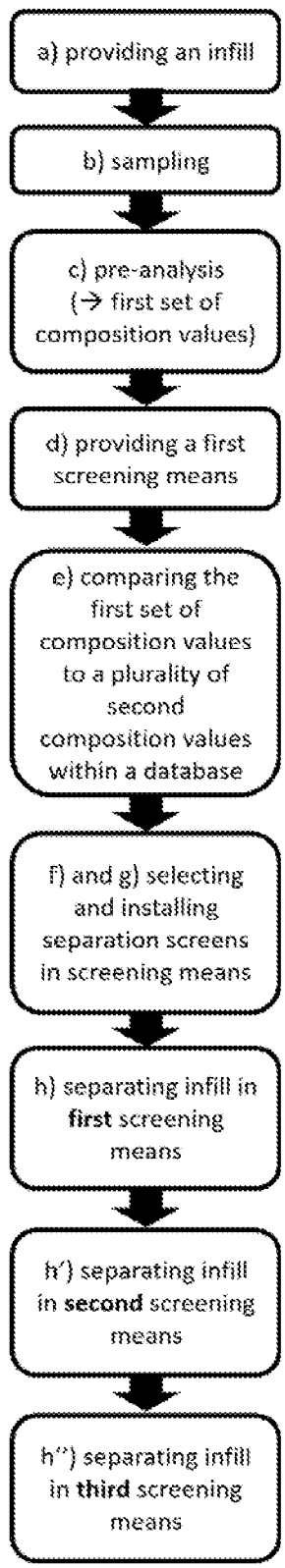
FIGS. 3 a)-e) each are a schematic overview of the method for separating infill in three or four screening means.
Figure 3B:
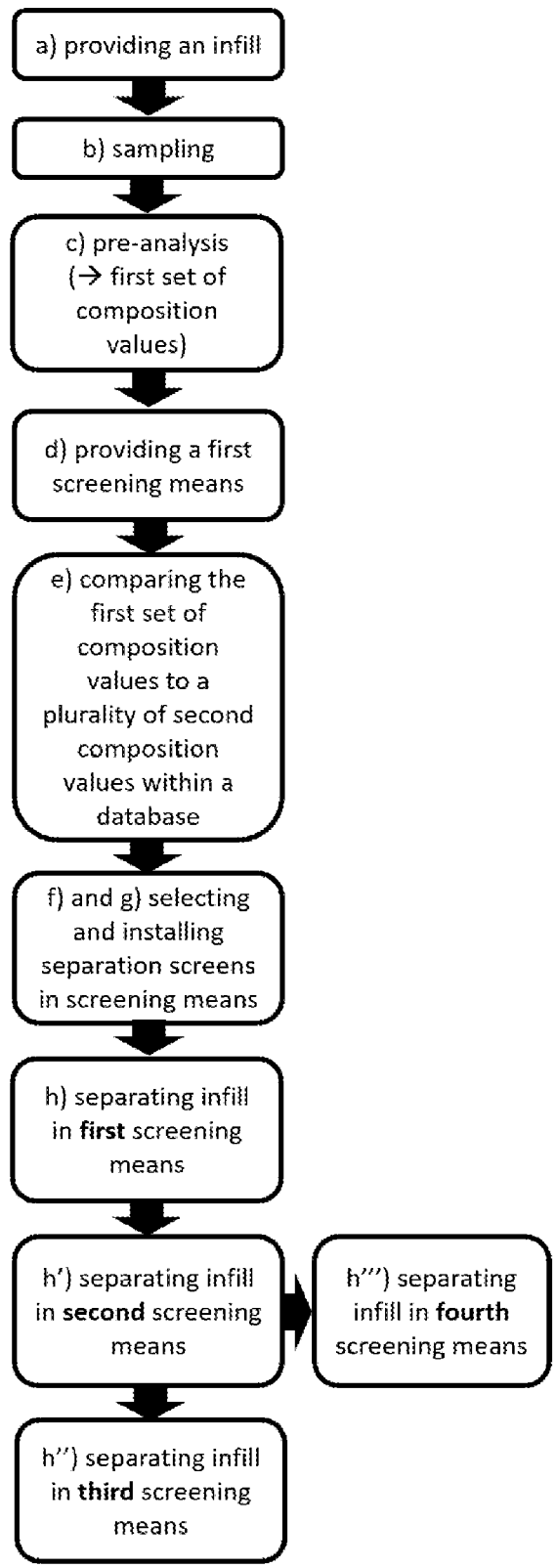
Figure 3C:
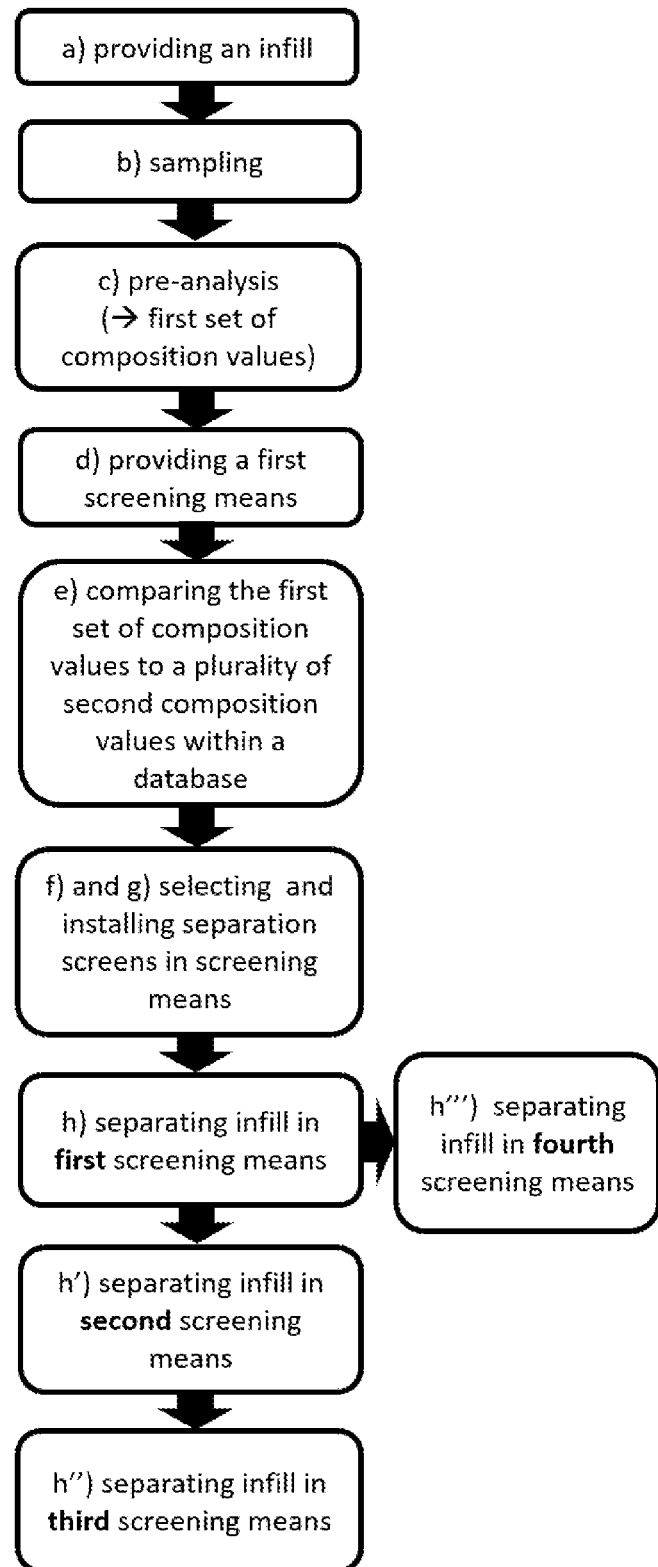
Figure 3D:
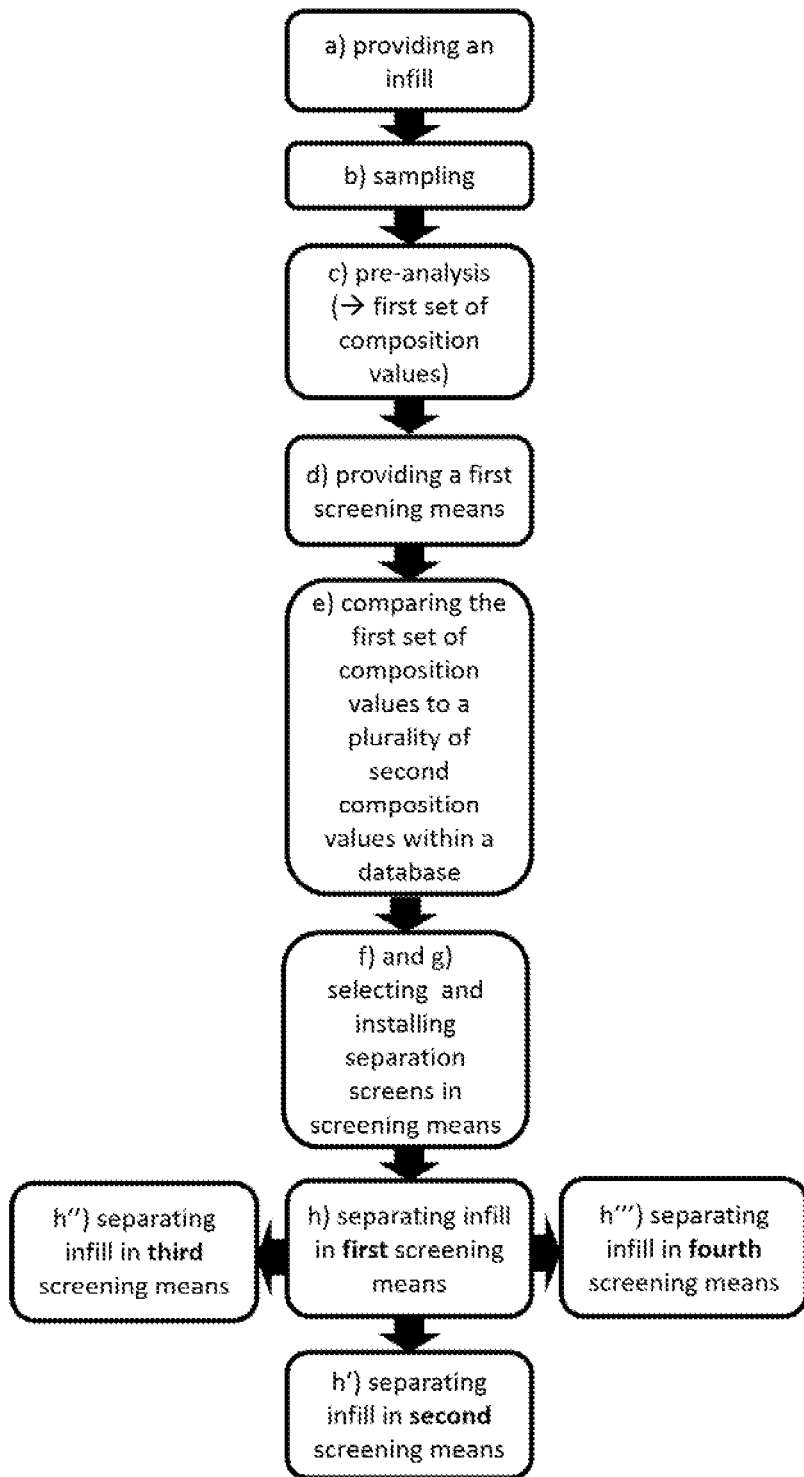

FIG. 2 shows a schematic overview of the method for separating infill is depicted. With reference to FIG. 1, the embodiment in FIG. 2 additionally comprises step (h') of separating one or more fractions of the separated plurality of fractions from the infill of step (h) in a second screening means comprising a second set of separation screens. The second set of separation screens is different from the first set of separation screens in the first screening means and is installed on the basis of the selected set of separation screens from the database in step (f). Both, the first and the second set(s) of separation screens are selected on the basis of the same pre-analysis performed in step (c).

Suitably, a selected fraction, a plurality of selected fractions, and/or all fractions of the plurality of fractions separated in step (h) are further separated by a second and further screening means in step (h'). Preferably the separation in second and further screening means in step (h') is carried out consecutively in the same screening means or in parallel to another in a plurality of screening means. Each of the plurality of screening means comprises a selected set of separation screens selected on the basis of the same pre-analysis performed in step (c).

FIGS. 3 a)-e) each show variations, wherein a schematic overview of the method for separating infill by more than two screening means is depicted. Additional to the first step of separation (h) in a first screening means, the additional separation steps are furnished in a second, a third, and possibly a fourth screening means. Each first, second, third and fourth screening means comprises a different set of separation screens selected on the basis of the selected set of separation screens from the database in step (f).

For each step of separation, the set of separation screens of each first, second, third and fourth screening means is preferably different with regards to the mesh size of at least one separation screen within a set of separation screens. The selected combination of screening means and set of separation screens further improves the purity of the separated fractions.

FIG. 3 a) shows a schematic overview of the method for separating infill where a total of three separation steps h), h') and h") are consecutively separating the infill into a plurality of fractions. Each of said separation steps is performed in a screening means. All fractions, one selected fraction, or a plurality of selected fractions of the fractions separated in step h) or h') can be further separated in step h') or h"), respectively. Suitably the mesh size of the separation screens of the screening means of step h') are smaller than the mesh sizes of the separation screens of the screening means of step h), and/or suitably the mesh size of the separation screens of the screening means of step h") are smaller than the mesh sizes of the separation screens of the screening means of step h'). By smaller mesh sizes it is meant that at least one of the separation screens of the screening means of step h') or h") has/have smaller mesh sizes than at least one of the separation screens of the screening means of step h) or h'), respectively.

FIG. 3 b) shows a schematic overview of the method for separating infill where a total of four separation steps h), h'), h") and h''') in four screening means are separating the infill into a plurality of fractions. Therein three of the four separation steps, h), h'), and h"), as well as h), h') and h''') are conducted consecutively. In the shown embodiment, at least one selected fraction obtained in step h') is then further separated in step h") and/or in step h'''). Preferably at least one selected fraction for separation in step h") differs from the at least one selected fraction for separation in step h'''). Suitably, the mesh size of at least one separation screen is different for each of the sets of separation screens within the four screening means of the four separation steps h), h'), h") and h''').

FIG. 3 c) shows a schematic overview of the method for separating infill where a total of four separation steps h), h'), h") and h''') in four screening means are separating the infill into a plurality of fractions. Therein three of the four separation steps, h), h'), and h") are conducted consecutively. The separation steps h) and h''') are also conducted consecutively. In the shown embodiment, at least one selected fraction obtained in step h) is then further separated in step h') and/or in step h'''). Preferably the at least one selected fraction for separation in step h") differs from the at least one selected fraction for separation in step h''') either by particle size and/or specific gravity. Suitably the at least one selected fraction for separation in step h''') can have a larger particle size and/or specific gravity than the at least one selected fraction for separation in step h'), or vice versa. Suitably, the mesh size of at least one separation screen is different for at least one of the separation screens within each of the set of separation screens within the four screening means of the four separation steps h), h'), h") and h''').

FIG. 3 d) shows a schematic overview of the method for separating infill where a total of four separation steps h), h'), h") and h''') are separating the infill into a plurality of fractions in four screening means. Therein two of the four separation steps, h) and h'), as well as h) and h"), as well as h) and h''') are conducted consecutively. In the shown embodiment, at least one selected fraction obtained in step h) is then further separated in step h'), and/or in step h"), and/or in step h'''). Preferably the at least one selected fraction for separation in step h'), h") and h''') differs from another fraction by particle size and/or specific gravity. Suitably, the mesh size of at least one separation screen is different for each of the set of separation screens within the four screening means of the four separation steps h), h'), h") and h'").

FIG. 3 e) shows a schematic overview of the method for separating infill where a total of four separation steps 2×h), 1×h') and 1×h") are separating the infill into a plurality of fractions in four screening means. Therein the two screening means used for the steps of 2×h) have an identical set of separation screens and are configured to separate infill into a plurality of fractions. Preferably the separation is carried out in parallel. In the shown embodiment, at least one selected fraction obtained from each of both screening means in step h) is then further separated in step h'), and/or in step h"). Preferably the at least one selected fraction for separation in step h') and h") differs from another fraction by particle size and/or specific gravity, e.g. the obtained sand fraction in step h) is used for further separation in the screening means within step h') and the obtained rubber fraction in step h) is used for further separation in the screening means within step h"), or vice versa. The mesh size of at least one separation screen in the screening means is different for each of the set of separation screens within the two screening means of the separation steps h') and h"). Preferably the mesh sizes of the separation screens in h') are configured to separate sand and the mesh sizes of the separation screens in h") are configured to separate rubber, or vice versa.

The set of separation screens comprises two separation screens, preferably three separation screens, more preferably four separation screens, each of the separation screens has a mesh size selected from, but not limited to, a mesh size of substantially 5.0 mm, 4.0 mm, 3.0 mm, 2.5 mm, 2.3 mm, 2.0 mm, 1.8 mm, 1.5 mm, 1.2 mm, 1.0 mm, 0.8 mm, 0.7 mm, 0.6 mm, 0.5 mm, 0.4 mm, 0.3 mm, and/or 0.2 mm. Suitably the set of separation screens have a progressively finer mesh size. Alternatively, at least two of the separation screens within a set of separation screens have substantially the same mesh size, while the other separation screens within the same set of separation screens have a substantially different mesh size. Although the screening means has two, three or four separation screens, the number of obtained fractions after separation for each screening machine can vary between two, three, four or five fractions, respectively.

The step of separation of the dry or dried infill into a plurality of fractions may be performed in four screening means, each screening means comprising four separation screens selected on the basis of the selected sets of separation screens from the database in step (f). At least one of the four screening means is configured to separate an infill fraction with a composition (e.g. defined by particle size and/or specific gravity) different to the composition of the unseparated infill. Thereby it is possible to separate the infill fractions obtained by one or more first screening means even further, meaning into fractions with essentially higher purity by further separation in a second or further screening means. Said second or further screening means having a set of separation means being different from the set of separation screens within the first screening means.

Within the four sets of separation screens of the four screening means, at least one set of separation screens is different from the remaining sets of separation screens, such as with regards to mesh size of the separation screens in the set of separation screens. At least one plurality of fractions within the total plurality of fractions obtained by the four separation steps in the four screening means is differing from the remaining plurality of fractions by their fraction particle sizes and/or fraction-specific gravity. Although every screening means of the four screening means has four separation screens, the number of obtained fractions after separation for each screening means can vary between five fractions, four fractions, three fractions and/or two fractions.

Suitably, the step of separation is performed in a first screening means comprising a set of separation screens with a mesh size in the range of 5.0-0.6 mm;
    a second screening means comprising a set of separation screens with a mesh size in the range of 2.5-0.5 mm;
    a third screening means comprising a set of separation screens with a mesh size in the range of 0.6-0.2 mm; and
    a fourth screening means comprising a set of separation screens with a mesh size in the range of 0.8-0.3 mm.

Suitably the range of mesh size for each set of separation screens is overlapping with the range of mesh size of another set of separation screens.

Alternatively, the range of mesh size is only overlapping with another range of mesh size for only two or three of the four sets of separation screens.

Suitably the pre-analysis step comprises separation of the infill sample into more than two analysis fractions, preferably more than four analysis fractions, more preferably more than six analysis fractions, most preferably more than eight analysis fractions. The analysis fractions are obtained by sieving the sample through several sieves of a pre-analysis unit with mesh sizes between 0.2 mm-2.5 cm. The number of obtained analysis fractions is depending on the number of sieves installed in the pre-analysis unit. Each obtained analysis fraction has a predetermined range of particle size and/or specific gravity. Suitably the range of particle sizes can be selected from the ranges of 0-0.2 mm, 0.2-0.5 mm, 0.5-0.63 mm, 0.63-0.8 mm, 0.8 mm-1.0 cm, 1.0-1.18 cm, 1.18-1.4 cm, 1.4-1.6 cm, 1.6-2.0 cm, 2.0-2.5 cm, or any ranges within 0-2.5 cm.

The step(s) of pre-analysis (c) and/or separation (h), (h'), (h") and (h'") may result in fractions comprising one or more of coconut shell, fine sand, rough sand, graded sand, granulated styrene-butadiene rubber (SBR), crumb rubber, cork, organic infill, thermoplastic elastomers (TPE), thermoplastic olefins (TFO), neoprene rubber, fiberglass, polyethylene, polypropylene, nylon, or ethylene propylene diene monomers (EPDM).

Figure 4:
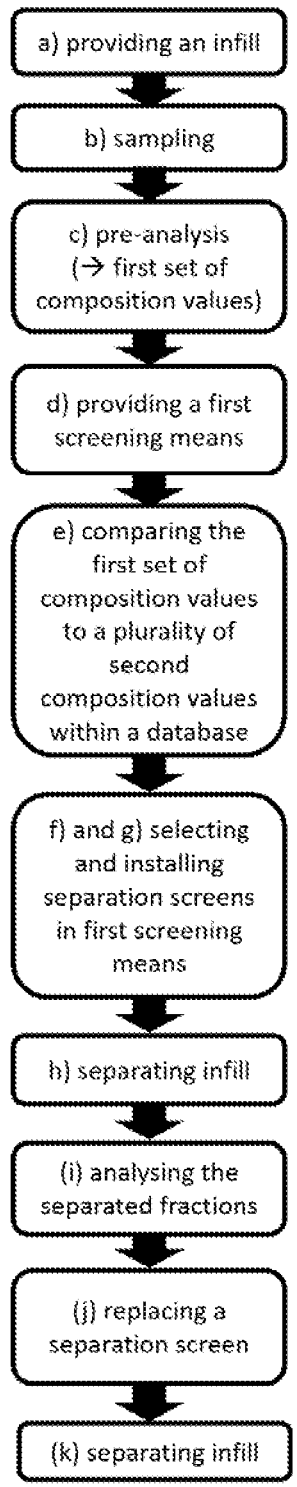
FIG. 4 is a schematic overview of the method for separating infill in a screening means with separation screen replacement.

FIG. 4 shows an embodiment of the inventive concept, wherein a schematic overview of the method for separating infill including a replacement of at least one separation screen is depicted. Additional to the steps of the previous embodiments, there are provided the steps of:
    (i) analysing at least one sample from a fraction obtained by the separation, wherein the analysis is carried out according to step (c);
    (j) replacing at least one separation screen in the set of separation screens in said screening means by a replacement separation screen, wherein the mesh size of the replaced separation screen is different from the mesh size of the replacement separation screen; and
    (k) separating the infill which has been analysed in step (i) into a plurality of fractions.

Suitably the analysis of step (i) is carried out in the same analysis unit as the pre-analysis of step (c). However, the number of sieves and/or type of sieves, e.g. with regards to mesh size, used for the analysis of step (i) can differ from the number and type of sieves used for the analysis of step (c). For a shorter analysis time, two or more analysis units can carry out the analysis step (i) of two or more separated fractions in parallel. Exemplary, a total of three to four samples for in-line analysis are taken every six hours, wherein each sample is taken from (a) a fraction substantially comprising rubber, (b) a fraction substantially comprising rough sand, (c) a fraction substantially comprising fine sand, and (d) a fraction substantially comprising turf if present.

Suitably the purity of the separated fractions is analysed in the pre-analysis unit or any other suitable analysis unit. Preferably the replacement of at least one separation screen of step (j), is only carried out if at least one of the analysed fractions is not considered to have a high purity and/or is not matching the analysis results of the pre-analysis of the corresponding sample.

The threshold for the correlation coefficient is suitably equal to or above 0.4, equal to or above 0.5, equal to or above 0.6, preferably equal to or above 0.7, more preferably equal to or above 0.8, most preferably equal to or above 0.9. When more than one correlation coefficient is above the predetermined threshold, preferably the correlation coefficient with the highest value is favoured for selecting a set of separation screens for the screening means. Suitably, if two or more correlation coefficients are substantially similar to another and/or within a certain range of statistical relationship, such as with a difference of around 0.1, 0.05, 0.02, 0.01 or less, then a correlation coefficient which is not the highest correlation coefficient but within the substantially similar correlation values within a group of correlation values of the highest correlation values, preferably within the highest 10 correlation values. can be selected such as by a human operator. This might be a time-saving advantage when an already installed set of separation screens in one or more screening means can provide sufficiently efficient separation.

Figure 5:
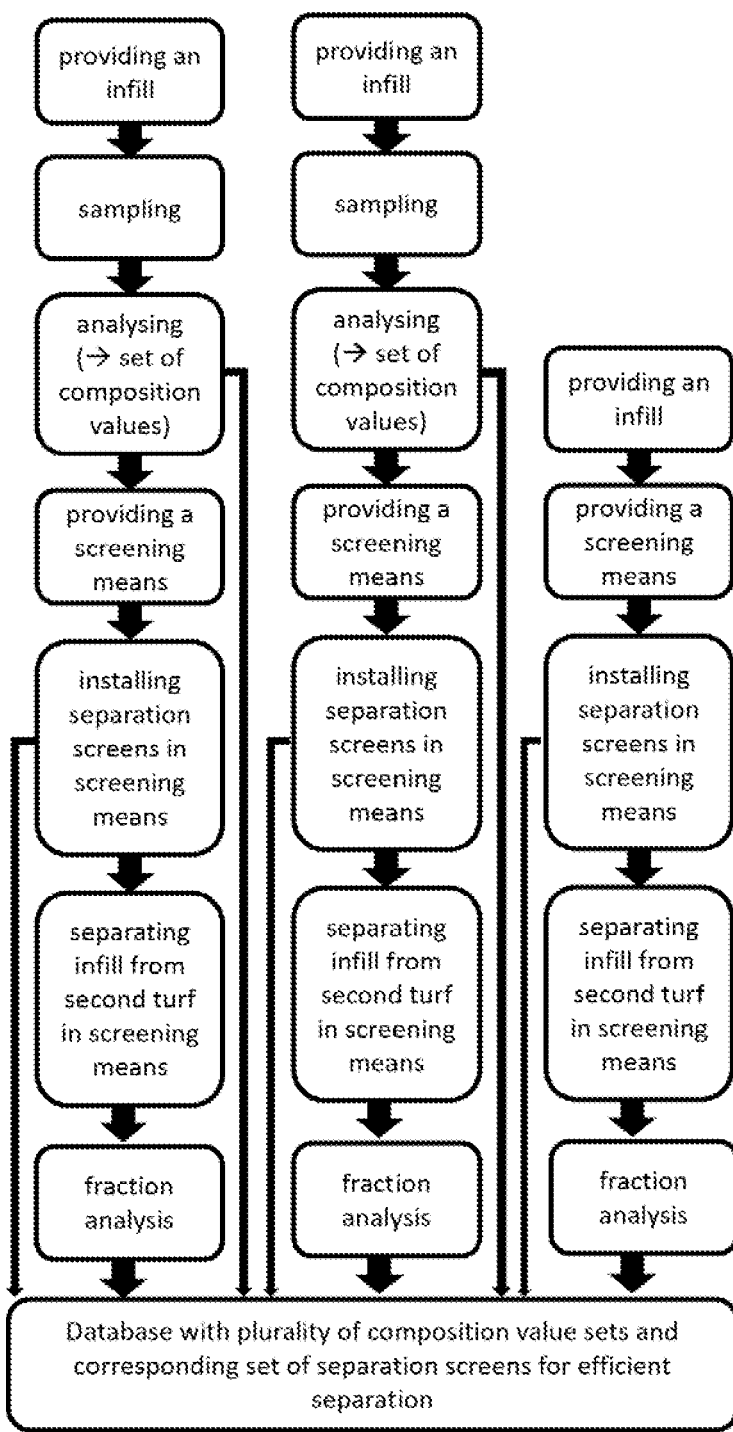
FIG. 5 is a schematic overview of the database generation of the method for separating infill.

FIG. 5 is a schematic overview of the how sets of composition values are stored in the database. Each composition value set of the set of the plurality of composition value sets of the database is corresponding to a previously analysed and separated infill composition, preferably of a second or further artificial turf product and/or infill. The generation of the database can suitably be carried out with analysis of the infill prior to separation but also without the analysis of the infill prior to separation.

When no analysis prior to separation is performed, the infill is first separated in screening means by separation screens, then the obtained fractions are analysed in the pre-analysis unit to generate a composition value set in this variation the dry or dried infill provided in step (a) is the thus obtained fractions and the initial separation is a step preceding step (a). The fraction analysis can be carried out while the separation is ongoing. To improve the purity of the fractions, one or more separation screens can be replaced by separation screens with a different mesh size. After replacement of at least one separation screen the obtained fractions are analysed again. Suitably, the steps of separation screen replacement and fraction analysis can be repeated until an efficient separation and/or a high purity of the fractions is achieved. Afterwards the information about the separation screens and the composition value set for efficient separation and high purity is entered into the database. When analysis prior to separation is performed, a sample from the infill is first analysed in a pre-analysis unit to obtain a set of composition values, then the infill is separated in screening means, having a plurality of separation screens, into a plurality of fractions. Said fractions are afterwards analysed to generate a set of composition values. The fraction analysis can be carried out while the separation is ongoing. To improve the purity of the fractions, one or more separation screens can be replaced by separation screens with a different mesh size. After replacement of at least one separation screen the obtained fractions are again analysed. Suitably, the steps of separation screen replacement and fraction analysis can be repeated until an efficient separation and a high purity of the fractions is achieved. Afterwards the information about the separation screens and the composition value set for efficient separation and high purity is entered into the database. An example for database entries for compositions of samples after analysis of different infill batches is illustrated in table 1. Examples for database entries of sets of separation screens for the separation of different infill batches are illustrated in table 2-5.

The database can contain composition value sets of analysed and/or separated infill from artificial turf products and/or infill from any other type of products where infill analysis and/or separation can be applied.

Suitably, after separation of dry or dried infill into a plurality of fractions, one or more of the first set of composition values obtained in step (c), information about the set of separation screens selected in step (f) and/or (j), and composition value sets from the analysis in step (i) are added to the database. By adding one or more of above listed values and/or information into the database the total number of sets of composition values is increasing. With a growing database the comparison of composition values in step (e) and the selection of separation screens in step (f) can result in matches with stronger mathematical correlation or statistical relationship. Meaning, each further entry of past separations into the database will improve the efficiency of future separation processes and enable the process to be applicable to any type of infill separation as long as the deviation is within an acceptable range.

TABLE 1

Example of database entries for compositions of different infills from second artificial turf products and/or second infill products. The grey columns indicate the proportional amount of particles [% (w/w)] within a certain range of particle size [cm].

| | mesh size | | | | | | | | | | |
|---|---|---|---|---|---|---|---|---|---|---|---|
| | 2.5 cm | 2.0 cm | 1.6 cm | 1.4 cm | 1.18 cm | 1.0 cm | 0.8 cm | 0.63 cm | 0.5 cm | 0.2 cm | — |
| | range of particle size | | | | | | | | | | |
| Batch no: | >2.5 cm | 2.5-2.0 cm | 2.0-1.6 cm | 1.6-1.4 cm | 1.4-1.18 cm | 1.18-1.0 cm | 1.0-0.8 cm | 0.8-0.63 cm | 0.63-0.5 cm | 0.5-0.2 cm | <0.2 cm | Total |
| 2060 | 0 | 0.3 | 1.8 | 1.9 | 2.9 | 5.9 | 5.9 | 14.8 | 44.7 | 20.6 | 0.6 | 99.4 |
| 2138 | 0 | 1.5 | 17.6 | 0 | 0 | 0 | 76.1 | 0 | 4.7 | 0 | 0.1 | 100 |
| 2141 | 0 | 6.9 | 34.8 | 19.5 | 20.4 | 9.6 | 7.1 | 1.8 | 0.4 | 0.2 | 0.1 | 100.8 |

TABLE 1-continued

Example of database entries for compositions of different infills from second artificial turf products and/or second infill products. The grey columns indicate the proportional amount of particles [% (w/w)] within a certain range of particle size [cm].

| | | | | | mesh size | | | | | | |
|---|---|---|---|---|---|---|---|---|---|---|---|
| | 2.5 cm | 2.0 cm | 1.6 cm | 1.4 cm | 1.18 cm | 1.0 cm | 0.8 cm | 0.63 cm | 0.5 cm | 0.2 cm | — |
| | | | | | range of particle size | | | | | | |
| Batch no: | >2.5 cm | 2.5-2.0 cm | 2.0-1.6 cm | 1.6-1.4 cm | 1.4-1.18 cm | 1.18-1.0 cm | 1.0-0.8 cm | 0.8-0.63 cm | 0.63-0.5 cm | 0.5-0.2 cm | <0.2 cm | Total |
|---|---|---|---|---|---|---|---|---|---|---|---|---|
| 1218 | 0 | 0.1 | 0.7 | 0.5 | 0.8 | 0 | 1.8 | 4.2 | 12.7 | 70.5 | 8.2 | 99.5 |
| 2057 | 0 | 0.0 | 0 | 0 | 0 | 0.1 | 3 | 20 | 28 | 45.4 | 3.3 | 99.8 |
| 2127 | 0.3 | 2.2 | 4.8 | 2.6 | 2.6 | 1.5 | 1.5 | 5.3 | 19.2 | 59.2 | 0.7 | 99.9 |
| 2097 | 0 | 0.6 | 2.9 | 2.1 | 3.2 | 2.5 | 3 | 5.4 | 18.4 | 58.7 | 3.2 | 100 |
| 1246 | 0.3 | 1.8 | 12.7 | 5.3 | 1.18 | 0 | 2.1 | 2.6 | 8.1 | 61.9 | 2.1 | 98.08 |
| 1227 | 0 | 11.3 | 24.8 | 9.2 | 5.8 | 0 | 5 | 6.5 | 12.2 | 23.5 | 1.1 | 99.4 |
| 5002 | 0 | 0.9 | 6 | 10.1 | 13.9 | 0 | 19.2 | 8.7 | 10.6 | 29.4 | 0.5 | 99.3 |
| 1231 | 0.4 | 18.7 | 16.6 | 3.8 | 2 | 0 | 6.7 | 18.4 | 18.9 | 14 | 0.5 | 100 |
| 1235 | 0.2 | 0.7 | 4.2 | 4 | 6 | 0 | 14.8 | 37.5 | 14.3 | 17.6 | 0.5 | 99.8 |
| 1211 | 0 | 6.0 | 15 | 5 | 2 | 0 | 6 | 23 | 23 | 19 | 1 | 100 |
| 1193 | 0 | 2.0 | 6 | 4 | 4 | 0 | 45 | 26 | 8.5 | 3.3 | 0.4 | 99.2 |
| 1192 | 4 | 4.0 | 10 | 10 | 8 | 0 | 7 | 5 | 23 | 32 | 0.1 | 103.1 |
| 2097 | 0 | 0.6 | 2.9 | 2.1 | 3.2 | 2.5 | 3 | 5.4 | 18.4 | 58.7 | 3.2 | 100 |
| 2090 | 0 | 1.4 | 13.6 | 8.9 | 10.1 | 6.6 | 8.9 | 11.9 | 17.7 | 19.5 | 1.3 | 99.9 |
| 2096 | 0 | 0.1 | 1 | 1.7 | 3.8 | 3.7 | 10.3 | 32.9 | 27.6 | 17.8 | 1.1 | 100 |
| 2049 | 0.1 | 0.7 | 3.4 | 3 | 3.5 | 2.5 | 3.4 | 14.8 | 23 | 43.9 | 1.7 | 100 |
| 2041 | 0.5 | 0.7 | 1.6 | 1.4 | 2.5 | 2.2 | 3.9 | 13.6 | 22.9 | 46.9 | 2.5 | 98.7 |
| 2038 | 0 | 0.0 | 0 | 0 | 0 | 0 | 0 | 0 | 0 | 0 | 0 | 0 |
| 2085 | 7.5 | 24.0 | 16.1 | 5.8 | 5.6 | 3.9 | 5.5 | 6.5 | 7.6 | 17 | 0.4 | 99.9 |
| 2118 | 0.1 | 0.0 | 0 | 0.1 | 0.1 | 0.3 | 2.8 | 13.8 | 24.5 | 53.7 | 4.6 | 100 |
| 2129 | 0.7 | 25.7 | 9.3 | 0.3 | 0.2 | 0.4 | 2.1 | 5.8 | 9.6 | 45.1 | 0.5 | 99.7 |
| 2112 | 0.4 | 4.8 | 16.8 | 10.4 | 9.4 | 5.2 | 7.4 | 15.8 | 14 | 15.2 | 0.7 | 100.1 |
| 2044 | 0 | 0 | 0 | 0 | 0 | 0.3 | 8.3 | 29.6 | 32.8 | 26.8 | 2.1 | 99.9 |
| 2066 | 0 | 0 | 0 | 0 | 0 | 1.1 | 3.2 | 21.1 | 32.1 | 38.3 | 3.8 | 99.6 |
| 2094 | 0 | 0 | 0 | 0 | 0 | 0 | 1.8 | 18.1 | 26.7 | 44.4 | 8.8 | 99.8 |
| 2161 | 0.9 | 10 | 18.8 | 7.3 | 6.4 | 3.8 | 3.3 | 2.4 | 5.4 | 40.7 | 0.7 | 99.7 |
| 2155 | 0.9 | 7.8 | 15.9 | 5.1 | 7.2 | 6.3 | 8.7 | 8.8 | 11.8 | 26.2 | 1 | 99.7 |
| 2157 | 2.2 | 10.9 | 13.1 | 4.1 | 3.2 | 1.6 | 3.8 | 13.7 | 28.2 | 18.1 | 1 | 99.9 |
| 2105 | 0.4 | 6.6 | 13.7 | 5.5 | 5.1 | 4.2 | 7.2 | 12.6 | 16.3 | 27.3 | 1 | 99.9 |
| 2165 | 0.3 | 5.7 | 8.9 | 3.9 | 4.5 | 3 | 10.7 | 20.1 | 15.7 | 26.3 | 0.6 | 99.7 |
| 2175 | 0.5 | 6.3 | 8.1 | 2.9 | 2.7 | 3.9 | 9.6 | 21.8 | 20.9 | 22.7 | 0.4 | 99.8 |
| 2173 | 1.2 | 9.8 | 14.4 | 4.9 | 3.2 | 1.7 | 10.9 | 23.4 | 17.3 | 11.8 | 1 | 99.6 |
| 2042 | 10.4 | 13.2 | 7.6 | 1.4 | 1 | 0.5 | 4.6 | 16.2 | 17.3 | 25.6 | 2 | 99.8 |
| 2127 | 0.3 | 2.2 | 4.8 | 2.6 | 2.6 | 1.5 | 1.5 | 5.3 | 19.2 | 59.2 | 0.7 | 99.9 |
| 2173 | 1.2 | 9.8 | 14.4 | 4.9 | 3.2 | 1.7 | 10.9 | 23.4 | 17.3 | 11.8 | 1 | 99.6 |
| 2051 | 0 | 0.2 | 1.6 | 2 | 3.2 | 3.5 | 5.5 | 7.9 | 14.2 | 60 | 1.5 | 99.6 |
| 1218 | 0 | 0.1 | 0.7 | 0.5 | 0.8 | 0 | 1.8 | 4.2 | 46.9 | 36.3 | 8.2 | 99.5 |
| 2113 | 4.5 | 21 | 13.3 | 4.8 | 6.1 | 4.8 | 7.5 | 8.2 | 6 | 19.3 | 0.5 | 99 |

TABLE 2

Separation of infill in four screening means with four separation screens per screening means. Infill batches with the compositions illustrated in table 1 are separated in separations means having separation screens with various mesh sizes.

| | screening means Nr. 4 (NSL) mesh size of screen number 1 to 4 | | | | screening means Nr. 3 mesh size of screen number 1 to 4 | | | | screening means Nr. 2 mesh size of screen number 1 to 4 | | | | screening means Nr. 1 mesh size of screen number 1 to 4 | | | |
|---|---|---|---|---|---|---|---|---|---|---|---|---|---|---|---|---|
| Batch no: | Nr. 1 [cm] | Nr. 2 [cm] | Nr. 3 [cm] | Nr. 4 [cm] | Nr. 1 [cm] | Nr. 2 [cm] | Nr. 3 [cm] | Nr. 4 [cm] | Nr. 1 [cm] | Nr. 2 [cm] | Nr. 3 [cm] | Nr. 4 [cm] | Nr. 1 [cm] | Nr. 2 [cm] | Nr. 3 [cm] | Nr. 4 [cm] |
| 2060 | 3 | 3 | 3 | 3 | 1.2 | 1.2 | 1.2 | 1.2 | 1 | 1 | 1 | 1 | 0.8 | 0.8 | 0.8 | 0.8 |
| 2138 | 3 | 3 | 4 | 4 | 1.5 | 1.5 | 1.8 | 1.8 | 1 | 1 | 1.2 | 1.2 | 0.8 | 0.8 | 0.8 | 0.8 |
| 2141 | 2.3 | 2.3 | 2.3 | 2.3 | 1.8 | 1.8 | 1.8 | 1.8 | 1.2 | 1.2 | 1.2 | 1.2 | 0.8 | 0.8 | 0.8 | 0.8 |
| 1218 | 3 | 3 | 3 | 3 | 1.2 | 1.2 | 1.2 | 1.2 | 1 | 1 | 1 | 1 | 0.8 | 0.8 | 0.8 | 0.8 |
| 2057 | 4 | 4 | 4 | 4 | 1.5 | 1.5 | 1.2 | 1.2 | 1.2 | 1.2 | 1.2 | 1.2 | 1 | 1 | 1 | 1 |
| 2127 | NSL 4 | NSL 4 | NSL 4 | NSL 4 | 1.5 | 1.5 | 1.2 | 1.2 | 1 | 1 | 1 | 1 | 0.8 | 0.8 | 0.8 | 0.8 |
| 2097 | NSL 4 | NSL 4 | NSL 4 | NSL 4 | 1.5 | 1.5 | 1.2 | 1.2 | 1 | 1 | 1 | 1 | 0.8 | 0.8 | 0.8 | 0.8 |
| 1218 | 3 | 3 | 3 | 3 | 1.2 | 1.2 | 1.2 | 1.2 | 1 | 1 | 1 | 1 | 0.8 | 0.8 | 0.8 | 0.8 |
| 1246 | NSL 4 | NSL 4 | NSL 4 | NSL 4 | 2 | 2 | 2 | 2 | 1.2 | 1.5 | 1.8 | 1.8 | 1 | 1 | 1 | 1 |
| 1227 | NSL 4 | NSL 4 | NSL 4 | NSL 4 | 2 | 2 | 2 | 2 | 1.2 | 1.5 | 1.8 | 1.8 | 1 | 1 | 1 | 1 |
| 5002 | NSL 4 | NSL 4 | NSL 4 | NSL 4 | 2 | 2 | 2 | 2 | 1.2 | 1.5 | 1.8 | 1.8 | 1 | 1 | 1 | 1 |

TABLE 2-continued

Separation of infill in four screening means with four separation screens per screening means.
Infill batches with the compositions illustrated in table 1 are separated in separations means having separation screens with various mesh sizes.

| Batch no: | screening means Nr. 4 (NSL) mesh size of screen number 1 to 4 | | | | screening means Nr. 3 mesh size of screen number 1 to 4 | | | | screening means Nr. 2 mesh size of screen number 1 to 4 | | | | screening means Nr. 1 mesh size of screen number 1 to 4 | | | |
|---|---|---|---|---|---|---|---|---|---|---|---|---|---|---|---|---|
| | Nr. 1 [cm] | Nr. 2 [cm] | Nr. 3 [cm] | Nr. 4 [cm] | Nr. 1 [cm] | Nr. 2 [cm] | Nr. 3 [cm] | Nr. 4 [cm] | Nr. 1 [cm] | Nr. 2 [cm] | Nr. 3 [cm] | Nr. 4 [cm] | Nr. 1 [cm] | Nr. 2 [cm] | Nr. 3 [cm] | Nr. 4 [cm] |
| 1231 | NSL 4 | NSL 4 | NSL 4 | NSL 4 | 2.3 | 2.3 | 2.3 | 2.3 | 1.8 | 1.8 | 1.8 | 1.8 | 1 | 1 | 1 | 1 |
| 1235 | NSL 4 | NSL 4 | NSL 4 | NSL 4 | 1.8 | 1.8 | 1.8 | 2 | 1.2 | 1.2 | 1.2 | 1.2 | 0.8 | 0.8 | 0.8 | 0.8 |
| 1211 | NSL 4 | NSL 4 | NSL 5 | NSL 5 | 2 | 2 | 2 | 2 | 1.2 | 1.2 | 1.2 | 1.2 | 0.8 | 0.8 | 0.8 | 0.8 |
| 1193 | NSL 4 | NSL 4 | NSL 5 | NSL 5 | 1.8 | 1.8 | 1.8 | 2 | 1.2 | 1.2 | 1.2 | 1.2 | 0.8 | 0.8 | 0.8 | 0.8 |
| 1192 | NSL 4 | NSL 4 | NSL 4 | NSL 5 | 1.2 | 1.2 | 1.5 | 1.5 | 1 | 1 | 1 | 1 | 0.8 | 0.8 | 0.8 | 0.8 |
| 2097 | NSL 3 | NSL 3 | NSL 4 | NSL 4 | 1.2 | 1.2 | 1.5 | 1.5 | 1 | 1 | 1 | 1 | 0.5 | 0.5 | 0.5 | 0.5 |
| 2090 | 3 | 3 | 3 | 3 | 1.2 | 1.2 | 1.5 | 1.5 | 1 | 1 | 1 | 1 | 0.8 | 0.8 | 0.8 | 0.8 |
| 2096 | 3 | 3 | 3 | 3 | 1.2 | 1.2 | 1.5 | 1.5 | 1 | 1 | 1 | 1 | 0.8 | 0.8 | 0.8 | 0.8 |
| 2049 | 3 | 3 | 3 | 3 | 1.2 | 1.2 | 1.5 | 1.5 | 1 | 1 | 1 | 1 | 0.8 | 0.8 | 0.8 | 0.8 |
| 2041 | 3 | 3 | 3 | 3 | 1.2 | 1.2 | 1.5 | 1.5 | 1 | 1 | 1 | 1 | 0.8 | 0.8 | 0.8 | 0.8 |
| 2038 | 4 | 4 | 4 | 5 | 2 | 2 | 2 | 2 | 1.5 | 1.5 | 1.5 | 1.5 | 0.8 | 0.8 | 0.8 | 0.8 |
| 2085 | 4 | 4 | 5 | 5 | 2 | 2 | 2 | 2 | 1.5 | 1.5 | 1.5 | 1.5 | 1 | 1 | 1 | 1 |
| 2118 | 4 | 4 | 5 | 5 | 2 | 2 | 2 | 2 | 1.5 | 1.5 | 1.5 | 1.5 | 1 | 1 | 1 | 1 |
| 2113 | 4 | 4 | 5 | 5 | 2 | 2 | 2 | 2 | 1.5 | 1.5 | 1.5 | 1.5 | 1 | 1 | 1 | 1 |
| 2129 | NSL 4 | 4 | 4 | 4 | 2 | 2 | 2 | 2.3 | 1.5 | 1.5 | 1.5 | 1.5 | 1 | 1 | 1 | 1 |
| 2112 | 4 | 4 | 4 | 4 | 2 | 2 | 2 | 2 | 1.5 | 1.5 | 1.5 | 1.5 | 0.8 | 0.8 | 0.8 | 0.8 |
| 2044 | NSL 3 | NSL 3 | NSL 3 | NSL 3 | 1.2 | 1.2 | 1.2 | 1.2 | 1 | 1 | 1 | 1 | 0.8 | 0.8 | 0.8 | 0.8 |
| 2066 | NSL 3 | NSL 3 | NSL 3 | NSL 3 | 1.2 | 1.2 | 1.2 | 1.2 | 1 | 1 | 1 | 1 | 0.8 | 0.8 | 0.8 | 0.8 |
| 2094 | NSL 3 | NSL 3 | NSL 3 | NSL 3 | 1.2 | 1.2 | 1.2 | 1.2 | 1 | 1 | 1 | 1 | 0.8 | 0.8 | 0.8 | 0.8 |
| 2161 | NSL 4 | NSL 4 | NSL 4 | NSL 4 | 1.8 | 1.8 | 1.8 | 1.8 | 1.2 | 1.2 | 1.2 | 1.2 | 1 | 1 | 1 | 1 |
| 2155 | NSL 4 | NSL 4 | NSL 4 | NSL 4 | 1.8 | 1.8 | 1.8 | 1.8 | 1.2 | 1.2 | 1.2 | 1.2 | 1 | 1 | 1 | 1 |
| 2157 | NSL 4 | NSL 4 | NSL 4 | NSL 4 | 1.8 | 1.8 | 1.8 | 1.8 | 1.2 | 1.2 | 1.2 | 1.2 | 1 | 1 | 1 | 1 |
| 2105 | NSL 4 | NSL 4 | NSL 4 | NSL 4 | 1.8 | 1.8 | 1.8 | 1.8 | 1.2 | 1.2 | 1.2 | 1.2 | 1 | 1 | 1 | 1 |
| 2165 | NSL 4 | NSL 4 | NSL 4 | NSL 4 | 1.8 | 1.8 | 1.8 | 1.8 | 1.2 | 1.2 | 1.2 | 1.2 | 1 | 1 | 1 | 1 |
| 2175 | NSL 4 | NSL 4 | NSL 4 | NSL 4 | 1.8 | 1.8 | 1.8 | 1.8 | 1.2 | 1.2 | 1.2 | 1.2 | 1 | 1 | 1 | 1 |
| 2173 | NSL 4 | NSL 4 | NSL 4 | NSL 4 | 1.8 | 1.8 | 1.8 | 1.8 | 1.2 | 1.2 | 1.2 | 1.2 | 1 | 1 | 1 | 1 |
| 2042 | NSL 4 | NSL 4 | NSL 4 | NSL 4 | 1.8 | 1.8 | 1.8 | 1.8 | 1.2 | 1.2 | 1.2 | 1.2 | 1 | 1 | 1 | 1 |
| 2127 | NSL 4 | NSL 4 | NSL 4 | NSL 4 | 1.8 | 1.8 | 1.8 | 1.8 | 1.2 | 1.2 | 1.2 | 1.2 | 1 | 1 | 1 | 1 |
| 2173 | NSL 4 | NSL 4 | NSL 4 | NSL 4 | 1.8 | 1.8 | 1.8 | 1.8 | 1.2 | 1.2 | 1.2 | 1.2 | 1 | 1 | 1 | 1 |
| 2051 | NSL 4 | 4 | 4 | 4 | 1.8 | 1.8 | 1.8 | 1.8 | 1.2 | 1.2 | 1.2 | 1.2 | 0.8 | 0.8 | 0.8 | 0.8 |

TABLE 3

Separation of infill in four screening means with four separation screens per screening means.
Infill batches with the compositions illustrated in table 1 are separated in separations means having separation screens with various mesh sizes.

| Batch no: | screening means Nr. 4 mesh size of screen number 1 to 4 | | | | screening means Nr. 3 mesh size of screen number 1 to 4 | | | | screening means Nr. 2 mesh size of screen number 1 to 4 | | | | screening means Nr. 1 mesh size of screen number 1 to 4 | | | |
|---|---|---|---|---|---|---|---|---|---|---|---|---|---|---|---|---|
| | Nr. 1 [cm] | Nr. 2 [cm] | Nr. 3 [cm] | Nr. 4 [cm] | Nr. 1 [cm] | Nr. 2 [cm] | Nr. 3 [cm] | Nr. 4 [cm] | Nr. 1 [cm] | Nr. 2 [cm] | Nr. 3 [cm] | Nr. 4 [cm] | Nr. 1 [cm] | Nr. 2 [cm] | Nr. 3 [cm] | Nr. 4 [cm] |
| 2060 | 2.5 | 2.5 | 2.5 | 2.5 | 1 | 1 | 1 | 1 | 0.7 | 0.7 | 0.7 | 0.7 | 0.5 | 0.5 | 0.5 | 0.5 |
| 2138 | 1.2 | 1.2 | 1.2 | 1.2 | 1 | 1 | 1 | 1 | 0.7 | 0.7 | 0.7 | 0.7 | 0.5 | 0.5 | 0.5 | 0.5 |
| 2141 | 2 | 2 | 2 | 2 | 1.5 | 1.5 | 1.5 | 1.5 | 1.2 | 1.2 | 1.2 | 1.2 | 0.8 | 0.8 | 0.8 | 0.8 |
| 1218 | 1.2 | 1.2 | 1.2 | 1.2 | 1 | 1 | 1 | 1 | 0.7 | 0.7 | 0.7 | 0.7 | 0.5 | 0.5 | 0.5 | 0.5 |
| 2057 | 1.8 | 1.8 | 1.5 | 1.5 | 1.2 | 1.2 | 1.2 | 1 | 1 | 1 | 1 | 0.8 | 0.7 | 0.7 | 0.7 | 0.7 |
| 2127 | 1.5 | 1.5 | 1.2 | 1.2 | 1.2 | 1.2 | 1.2 | 1.2 | 0.8 | 0.8 | 0.8 | 0.8 | 0.5 | 0.5 | 0.5 | 0.5 |
| 2097 | 1.5 | 1.5 | 1.2 | 1.2 | 1.2 | 1.2 | 1.2 | 1.2 | 0.8 | 0.8 | 0.8 | 0.8 | 0.5 | 0.5 | 0.5 | 0.5 |
| 1218 | 1.2 | 1.2 | 1.2 | 1.2 | 1 | 1 | 1 | 1 | 0.7 | 0.7 | 0.7 | 0.7 | 0.5 | 0.5 | 0.5 | 0.5 |
| 1246 | 1.5 | 1.5 | 1.5 | 2 | 1.2 | 1.2 | 1.2 | 1.2 | 1 | 1 | 1 | 1 | 0.8 | 0.8 | 0.8 | 0.8 |
| 1227 | 1.5 | 1.5 | 1.5 | 2 | 1.2 | 1.2 | 1.2 | 1.2 | 1 | 1 | 1 | 1 | 0.8 | 0.8 | 0.8 | 0.8 |
| 5002 | 1.5 | 1.5 | 1.5 | 2 | 1.2 | 1.2 | 1.2 | 1.2 | 1 | 1 | 1 | 1 | 0.8 | 0.8 | 0.8 | 0.8 |
| 1231 | 2.5 | 2.5 | 2.5 | 2.5 | 2 | 2 | 2 | 2 | 1.5 | 1.5 | 1.5 | 1.5 | 0.5 | 0.5 | 0.7 | 0.7 |
| 1235 | 2.5 | 2.5 | 2.5 | 2.5 | 2 | 2 | 2 | 2 | 1.5 | 1.5 | 1.5 | 1.5 | 0.5 | 0.5 | 0.7 | 0.7 |
| 1211 | 2 | 2 | 2 | 2 | 1.2 | 1.5 | 1.5 | 1.5 | 1.2 | 1.2 | 1.2 | 1.2 | 0.8 | 0.8 | 0.8 | 0.8 |
| 1193 | 2 | 2 | 2 | 2 | 1.5 | 1.5 | 1.5 | 1.5 | 1 | 1 | 1 | 1 | 0.8 | 0.8 | 0.8 | 0.8 |
| 1192 | 1.2 | 1.2 | 1.5 | 1.5 | 1.2 | 1.2 | 1.2 | 1.2 | 1 | 1 | 1 | 1 | 0.8 | 0.8 | 0.8 | 0.8 |
| 2097 | 1.2 | 1.2 | 1.5 | 1.5 | 1.2 | 1.2 | 1.2 | 1.2 | 1 | 1 | 1 | 1 | 0.8 | 0.8 | 0.8 | 0.8 |
| 2090 | 1.2 | 1.2 | 1.5 | 1.5 | 1.2 | 1.2 | 1.2 | 1.2 | 1 | 1 | 1 | 1 | 0.5 | 0.5 | 0.5 | 0.5 |
| 2096 | 1.2 | 1.2 | 1.5 | 1.5 | 1.2 | 1.2 | 1.2 | 1.2 | 1 | 1 | 1 | 1 | 0.5 | 0.5 | 0.5 | 0.5 |
| 2049 | 1.2 | 1.2 | 1.5 | 1.5 | 1.2 | 1.2 | 1.2 | 1.2 | 1 | 1 | 1 | 1 | 0.5 | 0.5 | 0.5 | 0.5 |
| 2041 | 1.2 | 1.2 | 1.5 | 1.5 | 1.2 | 1.2 | 1.2 | 1.2 | 1 | 1 | 1 | 1 | 0.5 | 0.5 | 0.5 | 0.5 |
| 2038 | 2 | 2 | 2 | 2 | 1.8 | 1.8 | 1.8 | 1.8 | 1.2 | 1.2 | 1.2 | 1.2 | 0.7 | 0.7 | 0.7 | 0.7 |

TABLE 3-continued

Separation of infill in four screening means with four separation screens per screening means.
Infill batches with the compositions illustrated in table 1 are separated in separations means having separation screens with various mesh sizes.

| Batch no: | screening means Nr. 4 mesh size of screen number 1 to 4 | | | | screening means Nr. 3 mesh size of screen number 1 to 4 | | | | screening means Nr. 2 mesh size of screen number 1 to 4 | | | | screening means Nr. 1 mesh size of screen number 1 to 4 | | | |
|---|---|---|---|---|---|---|---|---|---|---|---|---|---|---|---|---|
| | Nr. 1 [cm] | Nr. 2 [cm] | Nr. 3 [cm] | Nr. 4 [cm] | Nr. 1 [cm] | Nr. 2 [cm] | Nr. 3 [cm] | Nr. 4 [cm] | Nr. 1 [cm] | Nr. 2 [cm] | Nr. 3 [cm] | Nr. 4 [cm] | Nr. 1 [cm] | Nr. 2 [cm] | Nr. 3 [cm] | Nr. 4 [cm] |
| 2085 | 2 | 2 | 2 | 2.3 | 1.8 | 1.8 | 1.8 | 1.8 | 1.2 | 1.2 | 1.2 | 1.2 | 0.8 | 0.8 | 0.8 | 0.8 |
| 2118 | 2 | 2 | 2 | 2.3 | 1.8 | 1.8 | 1.8 | 1.8 | 1.2 | 1.2 | 1.2 | 1.2 | 0.8 | 0.8 | 0.8 | 0.8 |
| 2113 | 2 | 2 | 2 | 2.3 | 1.8 | 1.8 | 1.8 | 1.8 | 1.2 | 1.2 | 1.2 | 1.2 | 0.8 | 0.8 | 0.8 | 0.8 |
| 2129 | 2 | 2 | 2 | 2.3 | 1.8 | 1.8 | 1.8 | 1.8 | 1.2 | 1.2 | 1.2 | 1.2 | 0.8 | 0.8 | 0.8 | 0.8 |
| 2112 | 2 | 2 | 2 | 2 | 1.8 | 1.8 | 1.8 | 1.8 | 1.2 | 1.2 | 1.2 | 1.2 | 0.8 | 0.8 | 0.8 | 0.8 |
| 2044 | 1.5 | 1.5 | 1.5 | 1.5 | 1.2 | 1.2 | 1.2 | 1.2 | 1 | 1 | 1 | 1 | 0.8 | 0.8 | 0.8 | 0.8 |
| 2066 | 1.5 | 1.5 | 1.5 | 1.5 | 1.2 | 1.2 | 1.2 | 1.2 | 1 | 1 | 1 | 1 | 0.8 | 0.8 | 0.8 | 0.8 |
| 2094 | 1.5 | 1.5 | 1.5 | 1.5 | 1.2 | 1.2 | 1.2 | 1.2 | 1 | 1 | 1 | 1 | 0.8 | 0.8 | 0.8 | 0.8 |
| 2161 | 2 | 2 | 2 | 2 | 1.8 | 1.8 | 1.8 | 1.8 | 1 | 1 | 1 | 1 | 0.5 | 0.5 | 0.5 | 0.5 |
| 2155 | 2 | 2 | 2 | 2 | 1.8 | 1.8 | 1.8 | 1.8 | 1 | 1 | 1 | 1 | 0.5 | 0.5 | 0.5 | 0.5 |
| 2157 | 2 | 2 | 2 | 2 | 1.8 | 1.8 | 1.8 | 1.8 | 1 | 1 | 1 | 1 | 0.5 | 0.5 | 0.5 | 0.5 |
| 2105 | 2 | 2 | 2 | 2 | 1.8 | 1.8 | 1.8 | 1.8 | 1 | 1 | 1 | 1 | 0.5 | 0.5 | 0.5 | 0.5 |
| 2165 | 2 | 2 | 2 | 7 | 1.8 | 1.8 | 1.8 | 1.8 | 1 | 1 | 1 | 1 | 0.5 | 0.5 | 0.5 | 0.5 |
| 2175 | 2 | 2 | 2 | 2 | 1.8 | 1.8 | 1.8 | 1.8 | 1 | 1 | 1 | 1 | 0.5 | 0.5 | 0.5 | 0.5 |
| 2173 | 2 | 2 | 2 | 2 | 1.8 | 1.8 | 1.8 | 1.8 | 1 | 1 | 1 | 1 | 0.5 | 0.5 | 0.5 | 0.5 |
| 2042 | 2 | 2 | 2 | 2 | 1.8 | 1.8 | 1.8 | 1.8 | 1 | 1 | 1 | 1 | 0.5 | 0.5 | 0.5 | 0.5 |
| 2127 | 2 | 2 | 2 | 2 | 1.8 | 1.8 | 1.8 | 1.8 | 1 | 1 | 1 | 1 | 0.5 | 0.5 | 0.5 | 0.5 |
| 2173 | 2 | 2 | 2 | 2 | 1.8 | 1.8 | 1.8 | 1.8 | 1 | 1 | 1 | 1 | 0.5 | 0.5 | 0.5 | 0.5 |
| 2051 | 1.5 | 1.5 | 1.5 | 1.5 | 1.2 | 1.2 | 1.2 | 1.2 | 1 | 1 | 1 | 1 | 0.7 | 0.7 | 0.7 | 0.7 |

TABLE 4

Separation of sand fractions from infill in three screening means with three separation screens per screening means. Infill batches with the compositions illustrated in table 1 are separated in separations means having separation screens with various mesh sizes.

| Batch no: | screening means Nr. 4 (NSL) | | | screening means Nr. 3 | | | screening means Nr. 2 | | |
|---|---|---|---|---|---|---|---|---|---|
| | mesh size of screen Nr. 1 [cm] | mesh size of screen Nr. 2 [cm] | mesh size of screen Nr. 3 [cm] | mesh size of screen Nr. 1 [cm] | mesh size of screen Nr. 2 [cm] | mesh size of screen Nr. 3 [cm] | mesh size of screen Nr. 1 [cm] | mesh size of screen Nr. 2 [cm] | mesh size of screen Nr. 3 [cm] |
| 2060 | 0.6 | 0.6 | 0.6 | 0.5 | 0.5 | 0.5 | 0.2 | 0.2 | 0.2 |
| 2138 | 0.5 | 0.5 | 0.5 | 0.2 | 0.2 | 0.2 | 0 | 0 | 0 |
| 2141 | 0.2 | 0.2 | 0.2 | 0 | 0 | 0 | 0 | 0 | 0 |
| 1218 | 0.6 | 0.6 | 0.6 | 0.5 | 0.5 | 0.5 | 0.2 | 0.2 | 0.2 |
| 2057 | 0.6 | 0.6 | 0.6 | 0.5 | 0.5 | 0.5 | 0.2 | 0.2 | 0.2 |
| 2127 | 0.6 | 0.6 | 0.6 | 0.5 | 0.5 | 0.5 | 0.2 | 0.2 | 0.2 |
| 2097 | 0.6 | 0.6 | 0.6 | 0.5 | 0.5 | 0.5 | 0.2 | 0.2 | 0.2 |
| 1218 | 0.6 | 0.6 | 0.6 | 0.5 | 0.5 | 0.5 | 0.2 | 0.2 | 0.2 |
| 1246 | 0.6 | 0.6 | 0.6 | 0.5 | 0.5 | 0.5 | 0.2 | 0.2 | 0.2 |
| 1227 | 0.6 | 0.6 | 0.6 | 0.5 | 0.5 | 0.5 | 0.2 | 0.2 | 0.2 |
| 5002 | 0.6 | 0.6 | 0.6 | 0.5 | 0.5 | 0.5 | 0.2 | 0.2 | 0.2 |
| 1231 | 0.6 | 0.6 | 0.6 | 0.5 | 0.5 | 0.5 | 0.2 | 0.2 | 0.2 |
| 1235 | 0.6 | 0.6 | 0.6 | 0.5 | 0.5 | 0.5 | 0.2 | 0.2 | 0.2 |
| 1211 | 0.6 | 0.6 | 0.6 | 0.5 | 0.5 | 0.5 | 0.2 | 0.2 | 0.2 |
| 1193 | 0.6 | 0.6 | 0.6 | 0.5 | 0.5 | 0.5 | 0.2 | 0.2 | 0.2 |
| 1192 | 0.6 | 0.6 | 0.6 | 0.5 | 0.5 | 0.5 | 0.2 | 0.2 | 0.2 |
| 2097 | 0.6 | 0.6 | 0.6 | 0.5 | 0.5 | 0.5 | 0.2 | 0.2 | 0.2 |
| 2090 | 0.6 | 0.6 | 0.6 | 0.5 | 0.5 | 0.5 | 0.2 | 0.2 | 0.2 |
| 2096 | 0.6 | 0.6 | 0.6 | 0.5 | 0.5 | 0.5 | 0.2 | 0.2 | 0.2 |
| 2049 | 0.6 | 0.6 | 0.6 | 0.5 | 0.5 | 0.5 | 0.2 | 0.2 | 0.2 |
| 2041 | 0.6 | 0.6 | 0.6 | 0.5 | 0.5 | 0.5 | 0.2 | 0.2 | 0.2 |
| 2038 | 0.6 | 0.6 | 0.6 | 0.5 | 0.5 | 0.5 | 0.2 | 0.2 | 0.2 |
| 2085 | 0.6 | 0.6 | 0.6 | 0.5 | 0.5 | 0.5 | 0.2 | 0.2 | 0.2 |
| 2118 | 0.6 | 0.6 | 0.6 | 0.5 | 0.5 | 0.5 | 0.2 | 0.2 | 0.2 |
| 2113 | 0.6 | 0.6 | 0.6 | 0.5 | 0.5 | 0.5 | 0.2 | 0.2 | 0.2 |
| 2129 | 0.6 | 0.6 | 0.6 | 0.5 | 0.5 | 0.5 | 0.2 | 0.2 | 0.2 |
| 2112 | 0.6 | 0.6 | 0.6 | 0.5 | 0.5 | 0.5 | 0.2 | 0.2 | 0.2 |
| 2044 | 0.6 | 0.6 | 0.6 | 0.5 | 0.5 | 0.5 | 0.2 | 0.2 | 0.2 |
| 2066 | 0.6 | 0.6 | 0.6 | 0.5 | 0.5 | 0.5 | 0.2 | 0.2 | 0.2 |
| 2094 | 0.6 | 0.6 | 0.6 | 0.5 | 0.5 | 0.5 | 0.2 | 0.2 | 0.2 |
| 2161 | 0.6 | 0.6 | 0.6 | 0.5 | 0.5 | 0.5 | 0.2 | 0.2 | 0.2 |

TABLE 4-continued

Separation of sand fractions from infill in three screening means with three separation screens per screening means. Infill batches with the compositions illustrated in table 1 are separated in separations means having separation screens with various mesh sizes.

| | screening means Nr. 4 (NSL) | | | screening means Nr. 3 | | | screening means Nr. 2 | | |
|---|---|---|---|---|---|---|---|---|---|
| Batch no: | mesh size of screen Nr. 1 [cm] | mesh size of screen Nr. 2 [cm] | mesh size of screen Nr. 3 [cm] | mesh size of screen Nr. 1 [cm] | mesh size of screen Nr. 2 [cm] | mesh size of screen Nr. 3 [cm] | mesh size of screen Nr. 1 [cm] | mesh size of screen Nr. 2 [cm] | mesh size of screen Nr. 3 [cm] |
| 2155 | 0.6 | 0.6 | 0.6 | 0.5 | 0.5 | 0.5 | 0.2 | 0.2 | 0.2 |
| 2157 | 0.6 | 0.6 | 0.6 | 0.5 | 0.5 | 0.5 | 0.2 | 0.2 | 0.2 |
| 2105 | 0.6 | 0.6 | 0.6 | 0.5 | 0.5 | 0.5 | 0.2 | 0.2 | 0.2 |
| 2165 | 0.6 | 0.6 | 0.6 | 0.5 | 0.5 | 0.5 | 0.2 | 0.2 | 0.2 |
| 2175 | 0.6 | 0.6 | 0.6 | 0.5 | 0.5 | 0.5 | 0.2 | 0.2 | 0.2 |
| 2173 | 0.6 | 0.6 | 0.6 | 0.5 | 0.5 | 0.5 | 0.2 | 0.2 | 0.2 |
| 2042 | 0.6 | 0.6 | 0.6 | 0.5 | 0.5 | 0.5 | 0.2 | 0.2 | 0.2 |
| 2127 | 0.6 | 0.6 | 0.6 | 0.5 | 0.5 | 0.5 | 0.2 | 0.2 | 0.2 |
| 2173 | 0.6 | 0.6 | 0.6 | 0.5 | 0.5 | 0.5 | 0.2 | 0.2 | 0.2 |
| 2051 | 0.6 | 0.6 | 0.6 | 0.5 | 0.5 | 0.5 | 0.2 | 0.2 | 0.2 |

TABLE 5

Separation of rubber from infill in two screening means with two separation screens per screening means. Infill batches with the compositions illustrated in table 1 are separated in separations means having separation screens with various mesh sizes.

| | screening means Nr. 2 | | screening means Nr. 1 | |
|---|---|---|---|---|
| Batch no: | mesh size of screen Nr. 1 [cm] | mesh size of screen Nr. 2 [cm] | mesh size of screen Nr. 1 [cm] | mesh size of screen Nr. 2 [cm] |
| 2060 | 0.8 | 0.8 | 0.3 | 0.3 |
| 2138 | 0.8 | 0.8 | 0.3 | 0.3 |
| 2141 | 0.8 | 0.8 | 0.3 | 0.3 |
| 1218 | 0.8 | 0.8 | 0.3 | 0.3 |
| 2057 | 0.8 | 0.8 | 0.3 | 0.3 |
| 2127 | 0.8 | 0.8 | 0.3 | 0.3 |
| 2097 | 0.8 | 0.8 | 0.3 | 0.3 |
| 1218 | 0.8 | 0.8 | 0.3 | 0.3 |
| 1246 | 0.8 | 0.8 | 0.3 | 0.3 |
| 1227 | 0.8 | 0.8 | 0.3 | 0.3 |
| 5002 | 0.8 | 0.8 | 0.3 | 0.3 |
| 1231 | 0.8 | 0.8 | 0.3 | 0.3 |
| 1235 | 0.8 | 0.8 | 0.3 | 0.3 |
| 1211 | 0.8 | 0.8 | 0.3 | 0.3 |
| 1193 | 0.8 | 0.8 | 0.3 | 0.3 |
| 1192 | 0.8 | 0.8 | 0.3 | 0.3 |
| 2097 | 0.8 | 0.8 | 0.3 | 0.3 |
| 2090 | 0.8 | 0.8 | 0.3 | 0.3 |
| 2096 | 0.8 | 0.8 | 0.3 | 0.3 |
| 2049 | 0.8 | 0.8 | 0.3 | 0.3 |
| 2041 | 0.8 | 0.8 | 0.3 | 0.3 |
| 2038 | 0.8 | 0.8 | 0.3 | 0.3 |
| 2085 | 0.8 | 0.8 | 0.3 | 0.3 |
| 2118 | 0.8 | 0.8 | 0.3 | 0.3 |
| 2113 | 0.8 | 0.8 | 0.3 | 0.3 |
| 2129 | 1.25 | 1.25 | 0.3 | 0.3 |
| 2112 | 0.8 | 0.8 | 0.3 | 0.3 |
| 2044 | 0.8 | 0.8 | 0.3 | 0.3 |
| 2066 | 0.8 | 0.8 | 0.3 | 0.3 |
| 2094 | 0.8 | 0.8 | 0.3 | 0.3 |
| 2161 | 0.8 | 0.8 | 0.3 | 0.3 |
| 2155 | 0.8 | 0.8 | 0.3 | 0.3 |
| 2157 | 0.8 | 0.8 | 0.3 | 0.3 |
| 2105 | 0.8 | 0.8 | 0.3 | 0.3 |
| 2165 | 0.8 | 0.8 | 0.3 | 0.3 |
| 2175 | 0.8 | 0.8 | 0.3 | 0.3 |
| 2173 | 0.8 | 0.8 | 0.3 | 0.3 |
| 2042 | 0.8 | 0.8 | 0.3 | 0.3 |
| 2127 | 0.8 | 0.8 | 0.3 | 0.3 |
| 2173 | 0.8 | 0.8 | 0.3 | 0.3 |
| 2051 | 0.8 | 0.8 | 0.3 | 0.3 |

Figure 6:
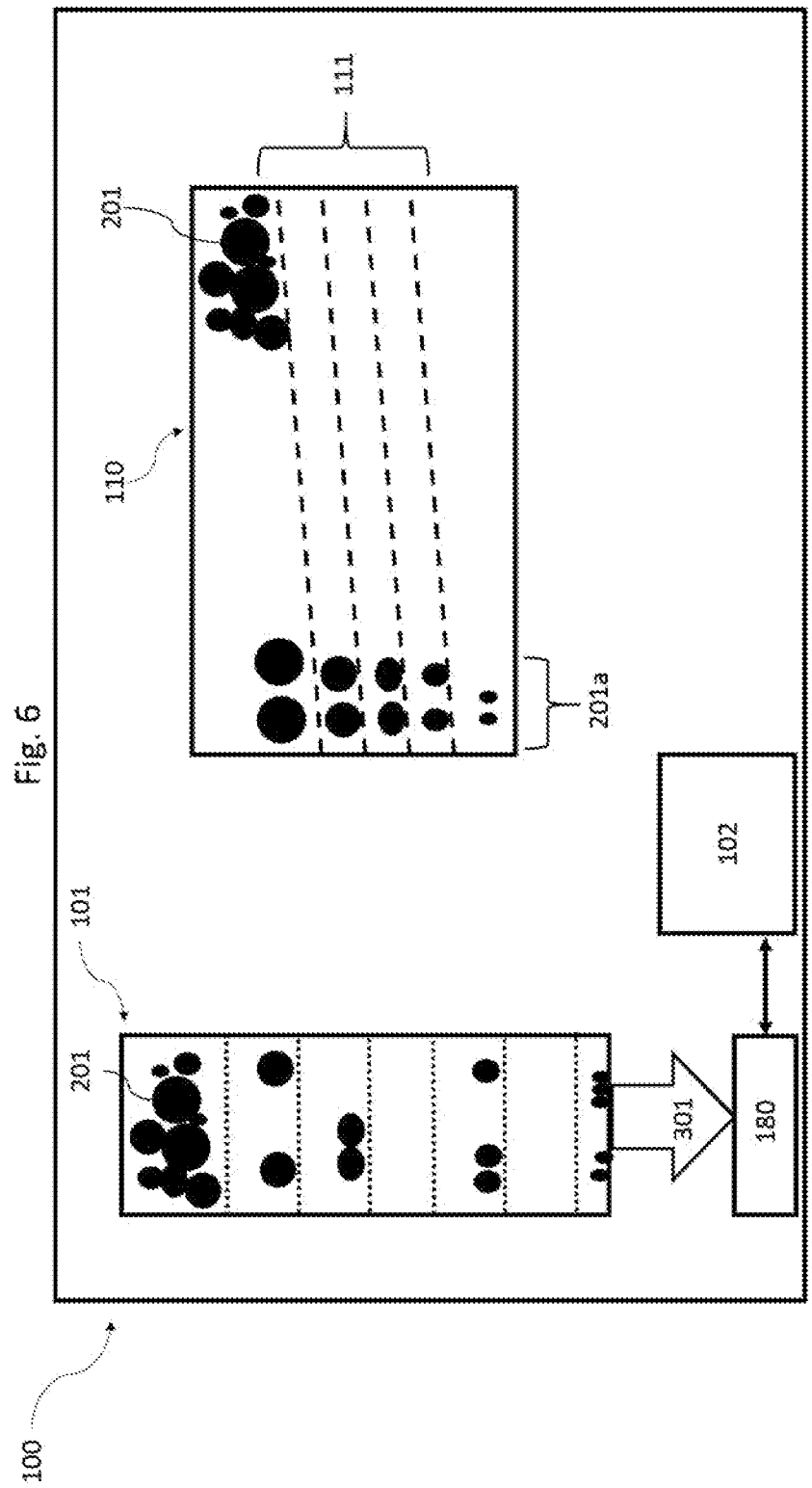
FIG. 6 is a schematic overview of the turf infill separation system with one screening means.

With reference to FIG. 6, a schematic overview of a separation system 100 suitable for separating a dry or dried infill, preferably from an artificial turf product said infill preferably comprising rubber and/or sand, into a plurality of fractions is shown. The separation system 100 comprises:
  a first screening means 110 configured to receive a first set of separation screens 111, said first set of separation screens being configured to separate infill 201, preferably from a first artificial turf product, into a first plurality of fractions 201a,
  wherein the separation system 100 further comprises:
  a pre-analysis unit 101 configured to determine the composition of the dry or dried infill 201 by particle size and/or specific gravity so as to obtain a first set of composition values 301 corresponding to the relative content of each separated analysis fraction in relation to the total content of analysed infill 201;
  a database 180 comprising a plurality of second sets of composition values, each set of composition values corresponding to a composition of dry or dried infill, preferably from a plurality of different artificial turf products and/or a second infill, and to a first predetermined set of separation screens,
  a processing unit 102 configured to calculate correlation coefficients and/or deviation values between the first set of composition values 301 and each of the plurality of second sets of composition values of the database 180.
The screening means 110 is configured to separate bulk material, such as infill 201, of different grain or particle sizes into a plurality of fractions 201a with pre-determined grain or particle size. The separation of infill 201 is carried out through horizontally vibrating separation screens with defined mesh sizes and/or perforations. The screening means 110 suitably has external screen outlets which allows very good accessibility and renders a high flexibility since the screens can easily be replaced with screens of another mesh size and/or perforation. The plurality of the separation screens is defined as the first set of separation screens 111. The first set of separation screens 111 comprises two, three, four or more than four separation screens, in the illustrated example in FIG. 6 it comprises four. Each separation screen of the set of separation screens 111 has a mesh size, said mesh size preferably being different from the mesh size of the other separation screens within the same set of separation screens 111.

The infill 201, e.g. from a first dry or dried infill, comprises different materials and particles with a large range of particle size, such as with particle sizes ranging from <0.1-2.5 cm, <0.1-3 cm, <0.1-4 cm or <0.1-5 cm. During the separation process the infill 201 is separated into a first plurality of fractions 201a by the set of separation screens 111. Suitably each of the fractions of the first plurality of fractions 201a comprises particles which have a homogeneous specific gravity and/or a particle size in a range being more narrow than the range of particle size within the infill 201 prior to separation, such as 0-5 mm, 0-2 mm, 0-6 mm, 2-5 mm, 2-6 mm, 2-10 mm, 5-10 mm, 2-15 mm, 5-10 mm, 5-7 mm, 7-10 mm, 8-10 mm, 5-8 mm, 6-8 mm, 7-15 mm, 20-40 mm, 40-50 mm, 30-40 mm, 30-50 mm, 18-30 mm, 18-40 mm, 18-50 mm, 12-18 mm, 12-20 mm, 12-23 mm, 12-30 mm, 12-40 mm, 12-50 mm, 10-15 mm, 15-20 mm, 15-30 mm, 8-15 mm, 8-12 mm, 12-15 mm, 0-8 mm or any other suitable particle size ranges.

The pre-analysis unit 101 is configured to separate the infill 201, e.g. of the first dry or dried infill, into more than two fractions, more than four fractions, preferably more than six fractions, most preferably more than eight fractions. Each analysis fraction has a predetermined particle size, range of particle size and/or specific gravity and comprises one or more of turf, fine sand, rough sand, graded sand, granulated styrene-butadiene rubber (SBR), crumb rubber, cork, organic infill, thermoplastic elastomers (TPE), thermoplastic olefins (TFO), neoprene rubber, fiberglass, polyethylene, polypropylene, nylon, or ethylene propylene diene monomers (EPDM). Prior or during pre-analysis the weight of the infill sample is determined, e.g. with a scale or via the pre-analysis unit 101 if the pre-analysis unit 101 has an integrated scale. During or after pre-analysis the weight of each analysis fraction is determined via a scale or via the pre-analysis unit 101 if the pre-analysis unit has an integrated scale 101. Based on the determined sample and fraction weights, the relative content of each analysis fraction in relation to the total sample is calculated as a set composition values 301 in % (w/w). The set of composition values 301 comprises information, such as data points or values about the relative content of each analysis fraction, and suitably also information about the material of the fractions and/or infill 201, such as sand type and/or rubber type and/or rubber colour. The set of composition values 301 is entered into the database 180 to then be compared with sets of composition values stored in the database 180. The comparison will be carried out by the processing unit 102.

Suitably, the pre-analysis unit 101 is a vibratory sieve shaker comprising a set of progressively finer mesh screens. The mesh screens within the pre-analysis unit 101 preferably have a mesh size of substantially 25 mm, 20 mm, 16 mm, 15 mm, 14 mm, 12 mm, 11.8 mm, 10 mm, 8 mm, 6 mm, 6.3 mm, 5 mm, 4 mm, 3 mm, 2 mm, 1 mm, substantially 0 mm or any other suitable mesh size. Suitably the pre-analysis unit 101 is an analytical sieve shaker, such as Retsch AS200 Basic®. Typically, such analytical sieve shakers have a measuring range for particles in the size range of 20 µm-25 mm, meaning that particles within the size range of 20 µm-25 mm can be separated into fractions, wherein each fraction has a pre-determined size range, such as 0-20 µm, 0-5 mm, 0 µm-2 mm, 0 µm-6 mm, 20 µm-5 mm, 20 µm-2 mm, 20 µm-6 mm, 2-5 mm, 2-6 mm, 2-10 mm, 5-6 mm, 5-10 mm, 8-10 mm, 6-8 mm, 10-12 mm, 2-15 mm, 5-10 mm, 5-7 mm, 7-10 mm, 8-10 mm, 5-8 mm, 6-8 mm, 7-15 mm, 12-14 mm, 14-16 mm, 20-40 mm, 40-50 mm, 30-40 mm, 30-50 mm, 18-30 mm, 18-40 mm, 18-50 mm, 12-18 mm, 16-20 mm, 12-20 mm, 12-23 mm, 20-25 mm, 12-30 mm, 12-40 mm, 12-50 mm, 10-15 mm, 15-20 mm, 15-30 mm, 8-15 mm, 8-12 mm, 12-15 mm, 0-8 mm or any other suitable particle size ranges.

The database 180 comprises a plurality of second sets of composition values, each set of composition values corresponding to a composition of dry or dried infill from a second infill product and/or a second artificial turf product, and to a first pre-determined set of separation screens for the separation of infill from said second products. In previous separation processes of infill from second products with different infill compositions in the screening means 110, the separation efficiency and/or the fraction purity has been improved by replacing the separation screens with separation screens having a different mesh size until the separation efficiency and/or the fraction purity was sufficiently high. The set of separation screens achieving a high separation efficiency and/or fraction purity is then entered and stored in the database 180 in connection with the plurality of second sets of composition values. The second sets of composition values represent the infill compositions of the second infill products determined by fraction analysis in the pre-analysis unit 101 or in any other analysis unit configured to separate infill into fractions with various particle size and/or specific gravity.

The second artificial turf product and/or second infill is a product comprising infill, wherein the infill of each second artificial turf product and/or second infill product comprises various materials and/or compositions. Examples for second artificial turf products and/or second infills are shown above in table 1. The second artificial turf products and/or second infills suitably comprise one or more of the materials of turf, coconut shell, fine sand, rough sand, graded sand, granulated styrene-butadiene rubber (SBR), crumb rubber, cork, organic infill, thermoplastic elastomers (TPE), thermoplastic olefins (TFO), neoprene rubber, fiberglass, polyethylene, polypropylene, nylon, and ethylene propylene diene monomers (EPDM) as a composition typical for infill material.

The processing unit 102 is configured to calculate a correlation coefficient and/or deviation value between the first set of composition values 301 and each of the plurality of second sets of composition values of the database 180. The processing unit 102 is communicatively connected to the database 180 and/or integrated into the database or vice versa. Exemplary the processing unit 102 is a computational unit comprising mathematical or statistical software configured to store the database 180 and to process the entries of the database 180, such as performing calculations about the statistical relationship between the second set of composition values of the database 180 and the first set of composition values, e.g. calculating correlation coefficients and/or deviation values. Software products which can serve as the database 180 and are compatible with the processing unit 102 are Microsoft Excel®, Scoro KPI®, Apache OpenOffice™, LibreOffice™, Spotfire™ MATLAB™ software, R statistical software, or any other software which is known to the skilled person.

Figure 7:
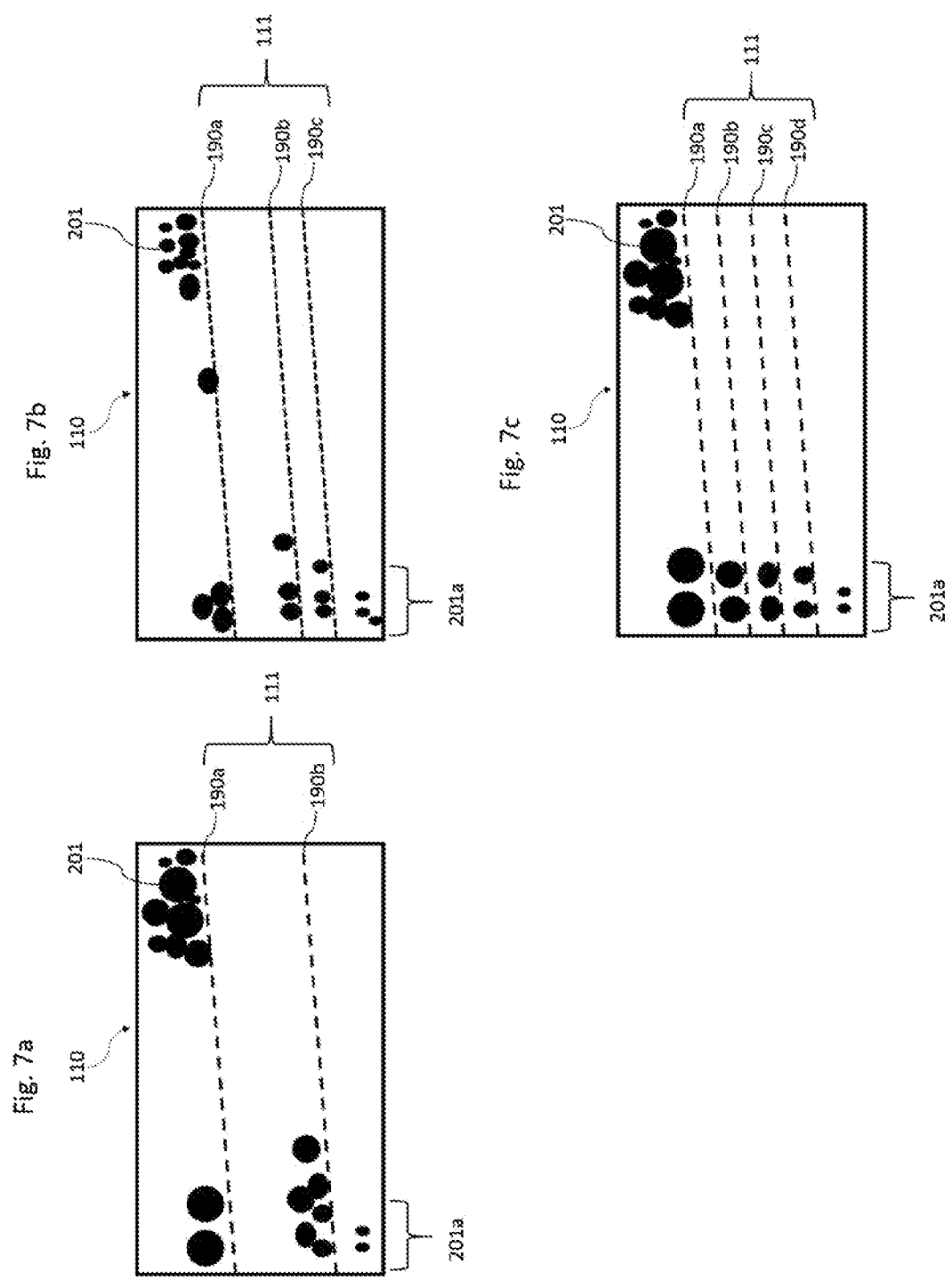
FIGS. 7 a)-c) show a schematic overview of screening means within the infill separation system.

FIG. 7 a)-c) show an embodiment with a schematic overview of a screening means 110 of the separation system 100 suitable for separating a dry or dried infill, wherein the set of separation screens 111 in the screening means 110 in FIG. 7 a) comprises two separation screens 190a, 190b, in FIG. 7 b) three separation screens 190a, 190b, 190c, and/or in FIG. 7 c) four separation screens 190a, 190b, 190c, 190d. Each of the separation screens has a mesh size selected from, but not limited to, a mesh size of one or more of 5.0 mm, 4.0 mm, 3.0 mm, 2.5 mm, 2.3 mm, 2.0 mm, 1.8 mm, 1.5 mm, 1.2 mm, 1.0 mm, 0.8 mm, 0.7 mm, 0.6 mm, 0.5 mm, 0.4 mm, 0.3 mm, or 0.2 mm. Suitably the set of separation screens have progressively finer mesh screens. Alternatively, at least two of the separation screens within the set of separation screens 111 have substantially the same mesh size.

The screening means 110 with the separation screens 111 separates the infill 201 into a first plurality of fractions 201a. The number of fractions, range of particle size and/or specific gravity of the fractions into which the infill 201 is separated is dependent on the number of separation screens installed in the screening means 110 and the mesh size thereof.

FIG. 7a) shows a screening means 110 with two separation screens 190a and 190b to separate infill 201, e.g. from a first dry or dried infill, into a total of up to three fractions.

FIG. 7b) shows a screening means 110 with three separation screens 190a, 190b and 190c to separate infill 201, e.g. from a first dry or dried infill into a total of up to four fractions.

FIG. 7c) shows a screening means 110 with four separation screens 190a, 190b, 190c and 190d to separate infill 201, e.g. from a first dry or dried infill, into a total of up to five fractions.

Figure 8:
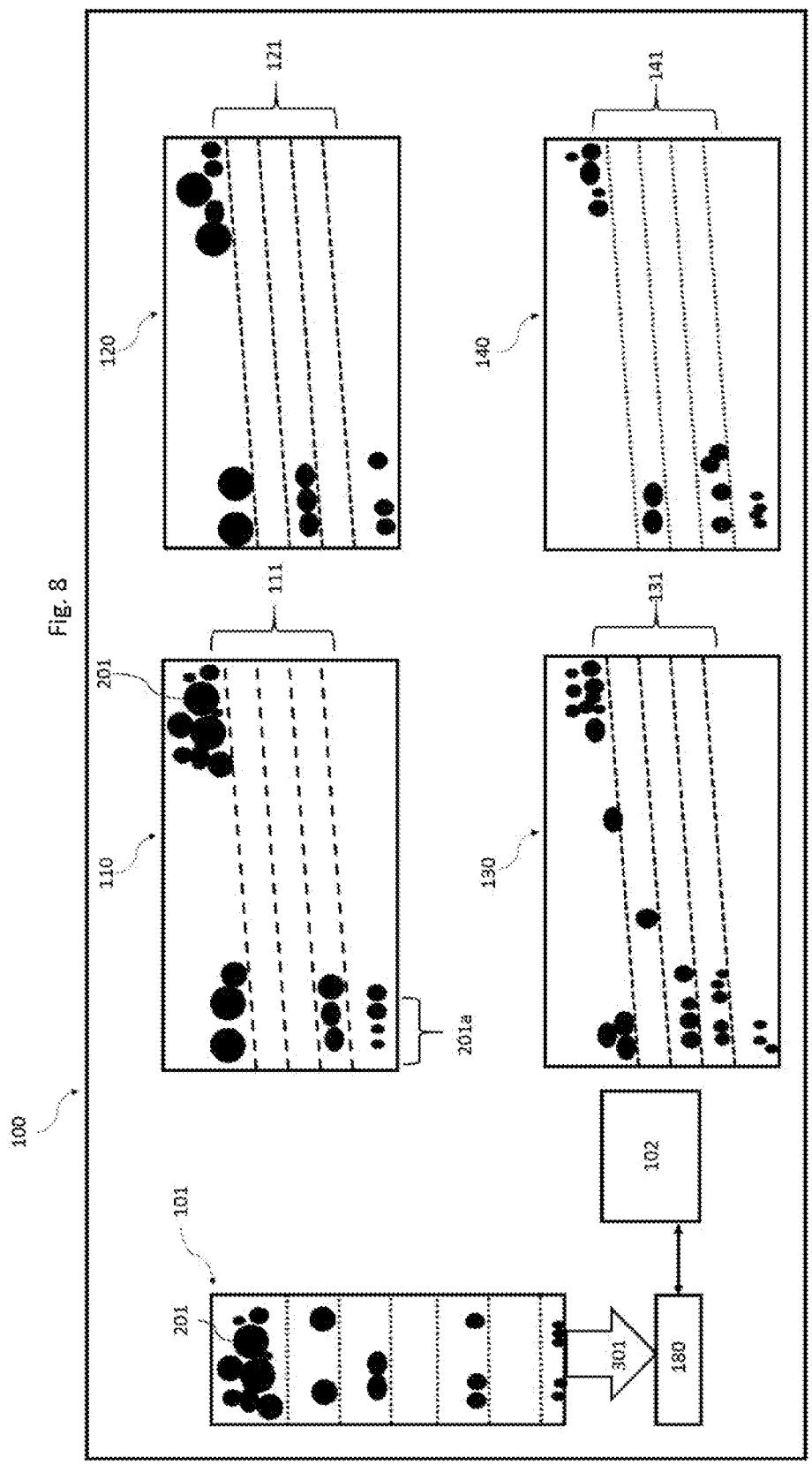
FIG. 8 is a schematic overview of an infill separation system with four screening means.

FIG. 8 shows a schematic overview of a separation system 100 having four screening means 110, 120, 130 and 140 suitable for separating a dry or dried infill, preferably from an artificial turf product comprising rubber and/or sand, into a plurality of fractions 201a,
wherein
the first screening means 110 comprises the first set of separation screens 111, each separation screen within the first set of separation screens 111 with a mesh size in the range of 5.0-0.6 mm;
the second screening means 120 comprises the second set of separation screens 121, each separation screen within the first set of separation screens 121 with a mesh size in the range of 2.5-0.5 mm;
the third screening means 130 comprises the third set of separation screens 131, each separation screen within the third set of separation screens 131 with a mesh size in the range of 0.6-0.2 mm; and
the fourth screening means 140 comprises the fourth set of separation screens 141, each separation screen within the fourth set of separation screens 141 with a mesh size in the range of 0.8-0.3 mm.

Suitably the sets of separation screens in the screening means 110, 120, 130 and 140 consist of one, two, three or four separation screens.

Suitably the range of the mesh size of the set of separation screens 111, 121, 131 and 141 in the screening means 110, 120, 130 and 140 is independent from another. The number of fractions obtained by a screening means with four separation screens can vary and be in the range of two fractions, three fractions, four fractions and/or five fractions.

Suitably at least one of the sets of separation screens 111, 121, 131 and 141 are selected by comparing the first set of composition values 301 of the infill 201 with the plurality of second sets of composition values within the database 180.

After having obtained a first plurality of fractions 201a from the first screening means 110, at least one fraction of the first plurality of fractions 201a can suitably consecutively be separated in the second screening means 120, third screening means 130, and/or fourth screening means 140. Suitably, any of the fractions within the plurality of fractions obtained by any of the screening means 110, 120, 130 and 140 can be further separated in any of the screening means 110, 120, 130 and 140 to further improve the separation of infill materials to obtain a high purity within the plurality of separated fractions.

Suitably fractions considered not having a high purity, e.g. fractions with a high heterogeneity of materials, heterogeneous specific gravity and/or heterogeneous particle size will be further separated by at least one of the screening means 110, 120, 130 and/or 140.

Suitably the purity of the separated fractions is analysed with the pre-analysis unit 101 or any other suitable analysis unit, such as a vibratory sieve shaker.

FIG. 9 shows a schematic overview of a separation system 100 suitable for separating a dry or dried infill, preferably from an artificial turf product comprising rubber and/or sand, into a plurality of fractions, wherein the separation system 100 further comprises an in-line analysis unit 103 configured to determine the composition of a separated fraction 201b of the dry or dried infill 201 by particle size and/or specific gravity so as to obtain a third set of composition values corresponding to the composition of a separated fraction 201b of the dry or dried infill 201.

The in-line analysis unit 103 analyses the purity of the separated fractions. Suitably the in-line analysis unit 103 is a vibratory sieve shaker operated in close proximity to the screening means, in an analytical laboratory or in any other suitable location. The composition values obtained by the in-line analysis unit 103 are defined as the third set of composition values 303. The third set of composition values 303 is entered and stored in the database 180 for every analysed fraction 201b from the separated infill 201. The third set of composition values 303 serves as a basis to decide whether further separation of the analysed fraction 201b is necessary or not. Preferably, fractions with a purity of <95% (w/w), fractions with visible impurities, and/or fractions not matching the pre-analysis results will be further separated in screening means 110 with a set of separation screens 111 selected by comparing the third set of composition values 303 with second sets of composition values within the database 180.

Exemplary, a total of four samples for in-line analysis are taken every six hours, wherein each sample is taken from (i) a fraction substantially comprising rubber, (ii) a fraction substantially comprising rough sand, (iii) a fraction substantially comprising fine sand, and (iv) a fraction substantially comprising turf.

Suitably the in-line analysis of separated fractions in the in-line analysis unit 103 is carried out in a pre-determined time interval during the ongoing separation of infill 201 in the screening means 110. Preferably a fraction sample for the in-line analysis is taken every 12 hours, 10 hours, 8 hours, 6 hours, 4 hours or 2 hours. Alternatively, a fraction sample for the in-line analysis is only taken one, two, three or four times during every separation process, either at pre-determined time points or at random time points.

Suitably the pre-analysis unit 101 and/or the in-line analysis unit 103 is a vibratory sieve shaker comprising a set of progressively finer mesh screens. The mesh screens within the pre-analysis unit preferably have a size of substantially 2.5 mm, 2 mm, 1.6 mm, 1.4 mm, 1.18 mm, 1 mm, 0.8 mm, 0.63 mm, 0.5 mm, 0.2 mm, and/or 0 mm.

Suitably the pre-analysis unit 101 and the in-line analysis unit 103 are the same vibratory sieve shaker.

What is claimed is:

1. A method for separating a dry or dried infill having a composition of materials, preferably comprising rubber and sand, into a plurality of fractions comprising the steps of:
    i) providing a first dry or dried infill;
    ii) separating infill from the first infill in a first screening means having a first set of separation screens into fractions such as to obtain a first set of composition values;
    iii) replacing one or more separation screens in the first screening means by a separation screen with a different mesh size, the replacement of at least one separation screen only being carried out if at least one of the analysis fractions is not considered to have a high purity; and
    iv) separating the first infill into a plurality of fractions in the first screening means; wherein the screen replacement takes place during operation, or during a short pause in the operation, of the first screening means.

2. The method according to claim 1, wherein the dry or dried infill is from an artificial turf product.

3. The method according to claim 1, wherein the infill is taken after a majority infill has been separated from an artificial turf product, the infill is taken directly from an intact artificial turf product, after the majority of the infill has been separated from the remainder of the artificial turf product, either before, during or and/or after drying of the infill.

4. The method according to claim 1, wherein the replacing one or more separation screens in the first screening means comprises the steps of:
    comparing the first set of composition values of the dry or dried infill with a plurality of second sets of composition values of a database, each second set of composition values corresponding to a composition of materials and to a predetermined second set of separation screens, so as to obtain a correlation coefficient and/or deviation value between the first set of composition values and each of the plurality of second sets of composition values from the database;
    selecting the at least first set of separation screens to be received by the at least first screening means by selecting a set of separation screens corresponding to a second set of composition values and having a correlation coefficient above a predetermined threshold and/or having a relatively low deviation value, preferably the lowest available deviation value, when compared to the first set of composition values; and
    installing the selected first set of separation screens in the first screening means.

5. The method according to claim 4, further comprising:
    separating one or more fractions of the separated plurality of fractions from the infill of the separating the infill into the plurality of fractions in a second screening means comprising a second set of separation screens different from the first set of separation screens in the first screening means, the second set of separation screens being selected on the basis of the selected set of separation screens from the database in the selecting the at least first set of separation screens to be received by the at least first screening means.

6. The method according to claim 1, wherein more than two screening means are separating a dry or dried infill into a plurality of fractions, each screening means comprising a different set of separation screens.

7. The method according to claim 1, wherein the set of separation screens comprises two separation screens, preferably three separation screens, more preferably four separation screens, each of the separation screens has a mesh size selected from but not limited to a mesh size of substantially 5.0 mm, 4.0 mm, 3.0 mm, 2.5 mm, 2.3 mm, 2.0 mm, 1.8 mm, 1.5 mm, 1.2 mm, 1.0 mm, 0.8 mm, 0.7 mm, 0.6 mm, 0.5 mm, 0.4 mm, 0.3 mm, and/or 0.2 mm.

8. The method according to claim 4, wherein the step of separation of the dry or dried infill into a plurality of fractions is performed in four screening means, each screening means comprising four separation screens on the basis of the selected set of separation screens from the database in the selecting the at least first set of separation screens to be received by the at least first screening means.

9. The method according to claim 1, wherein the step of separation results in fractions comprising one or more of coconut shell, fine sand, rough sand, graded sand, granulated styrene-butadiene rubber (SBR), crumb rubber, cork, organic infill, thermoplastic elastomers (TPE), thermoplastic olefins (TFO), neoprene rubber, fiberglass, polyethylene, polypropylene, nylon, or ethylene propylene diene monomers (EPDM).

10. The method according to claim 1, wherein the purity of at least one the fractions separated in the determining the relative content of each separated analysis fraction in relation to the total content of analyzed infill is analyzed in a pre-analysis unit or another analysis unit.

* * * * *